United States Patent
Jeon et al.

(10) Patent No.: US 10,198,120 B2
(45) Date of Patent: Feb. 5, 2019

(54) TOUCH WINDOW AND DISPLAY WITH THE SAME

(71) Applicant: LG INNOTEK CO., LTD., Seoul (KR)

(72) Inventors: Eun Jung Jeon, Seoul (KR); Seung Jin Kim, Seoul (KR); Jong Sun Kim, Seoul (KR); Kyoung Jong Yoo, Seoul (KR); Byung Youl Moon, Seoul (KR); Dong Mug Seong, Seoul (KR); Jun Sik Shin, Seoul (KR); Yu Hong Jeon, Seoul (KR); Chan Kyu Koo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 1 day.

(21) Appl. No.: 15/125,536

(22) PCT Filed: Feb. 25, 2015

(86) PCT No.: PCT/KR2015/001794
§ 371 (c)(1),
(2) Date: Sep. 12, 2016

(87) PCT Pub. No.: WO2015/137642
PCT Pub. Date: Sep. 17, 2015

(65) Prior Publication Data
US 2017/0003821 A1    Jan. 5, 2017

(30) Foreign Application Priority Data

Mar. 13, 2014  (KR) .................. 10-2014-0029593
Apr. 9, 2014   (KR) .................. 10-2014-0042375
Apr. 30, 2014  (KR) .................. 10-2014-0052938

(51) Int. Cl.
G06F 3/044      (2006.01)
G06F 3/041      (2006.01)
(Continued)

(52) U.S. Cl.
CPC .......... G06F 3/0418 (2013.01); G06F 1/1643 (2013.01); G06F 3/044 (2013.01);
(Continued)

(58) Field of Classification Search
CPC ...................................................... G06F 3/041
See application file for complete search history.

(56) References Cited

U.S. PATENT DOCUMENTS

2012/0256642 A1 * 10/2012 Badaye .................. G06F 3/044
                                                    324/658
2013/0120287 A1    5/2013 Oh et al.
(Continued)

FOREIGN PATENT DOCUMENTS

KR   10-2011-0102996 A   9/2011
KR   10-2013-0022568 A   3/2013
(Continued)

*Primary Examiner* — Vijay Shankar
*Assistant Examiner* — Cory A Almeida
(74) *Attorney, Agent, or Firm* — Birch, Stewart, Kolasch & Birch, LLP

(57) ABSTRACT

Disclosed is a touch window including a substrate including a first region in which a touch is sensed and a second region provided at an edge of the first region, a sensing electrode to sense a touch position of the first region, and a wire connected with the sensing electrode. The wire includes comprises a first wire part provided in the first region and a second wire part provided in the second region.

12 Claims, 14 Drawing Sheets

(51) Int. Cl.
*G06F 1/16* (2006.01)
*G06F 3/047* (2006.01)

(52) U.S. Cl.
CPC ............ *G06F 3/047* (2013.01); *G06F 3/0412* (2013.01); *G06F 2203/04102* (2013.01); *G06F 2203/04108* (2013.01)

(56) References Cited

U.S. PATENT DOCUMENTS

| | | |
|---|---|---|
| 2013/0328575 A1 | 12/2013 | Ra et al. |
| 2014/0022467 A1 | 1/2014 | Chai et al. |
| 2014/0253827 A1* | 9/2014 | Gao .................... H05K 1/0298 349/12 |
| 2015/0123926 A1 | 5/2015 | Kang et al. |

FOREIGN PATENT DOCUMENTS

| | | |
|---|---|---|
| KR | 10-1322333 B1 | 10/2013 |
| KR | 10-2013-0124882 A | 11/2013 |
| KR | 10-2014-0017009 A | 2/2014 |

* cited by examiner

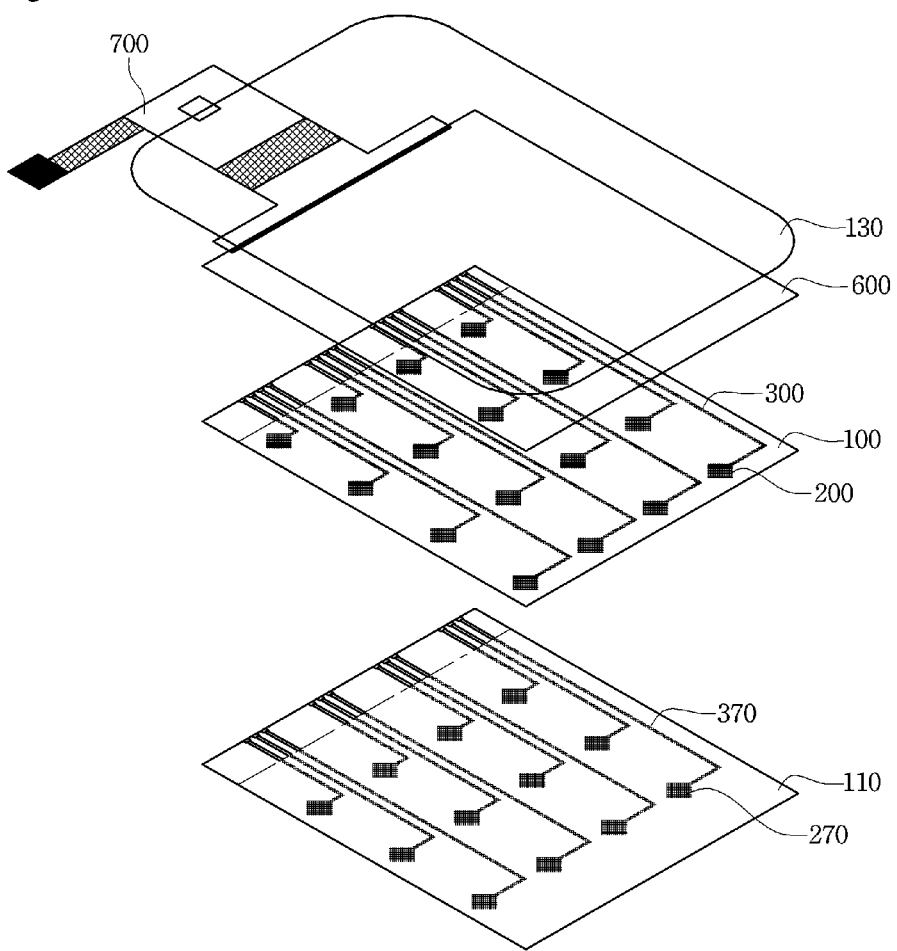
[Fig. 1]

[Fig. 2]
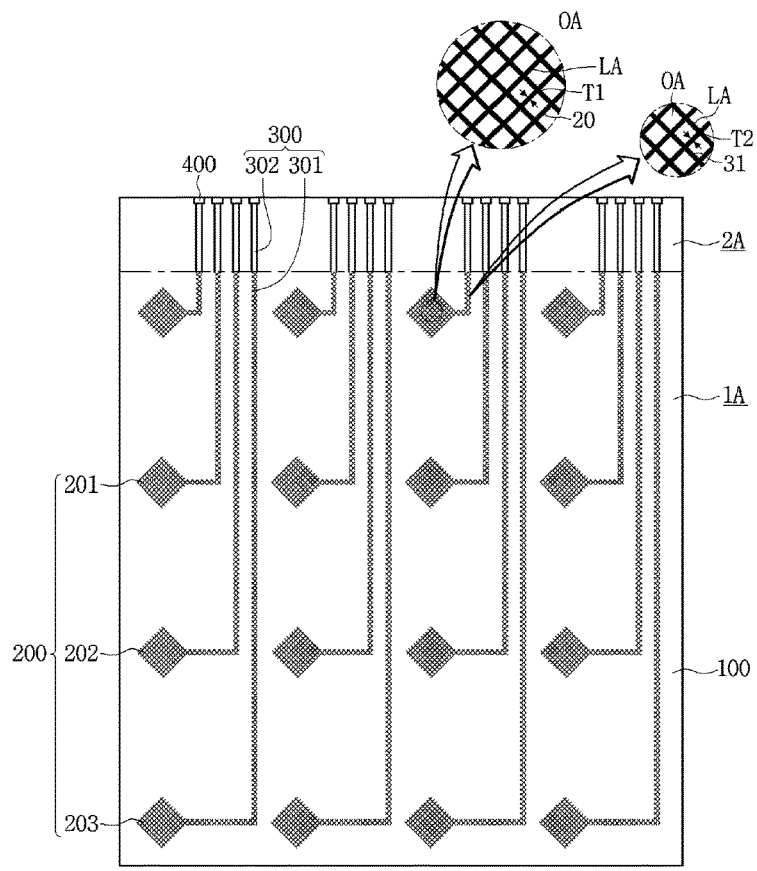
[Fig. 3]
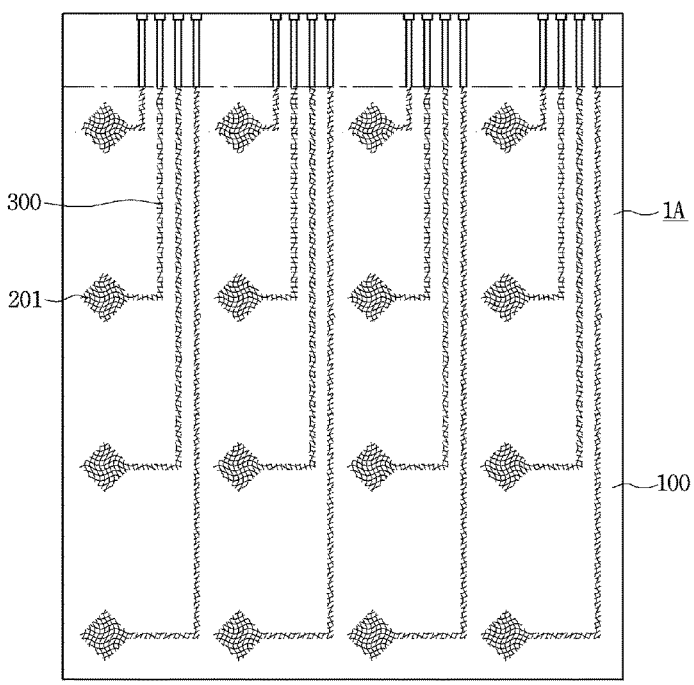

[Fig. 4]
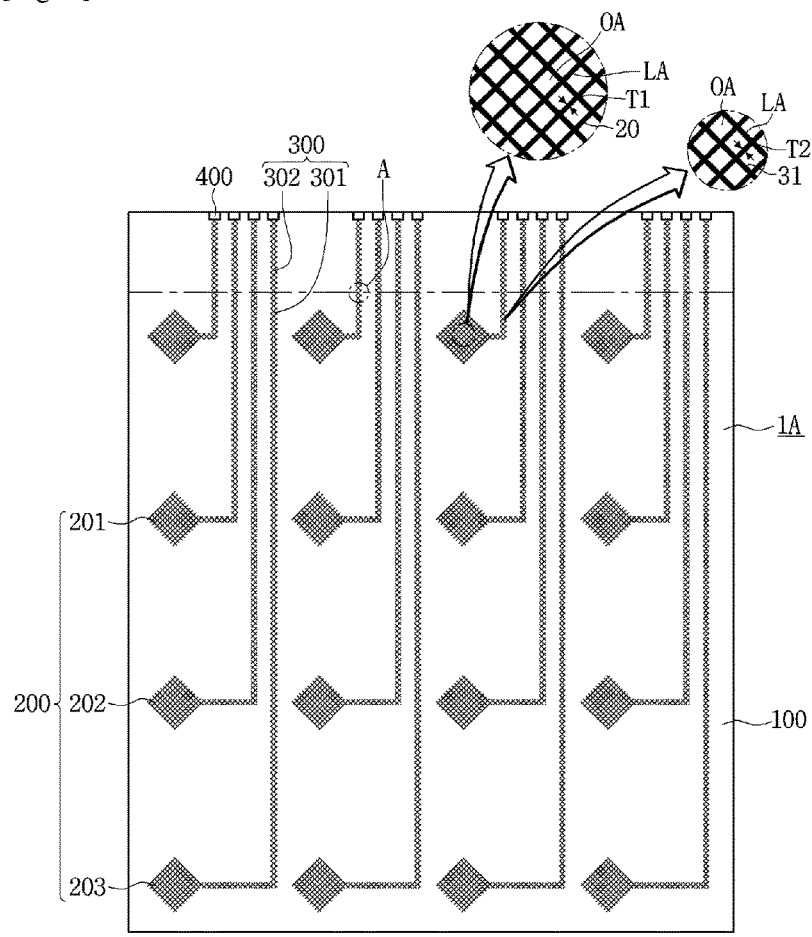
[Fig. 5]
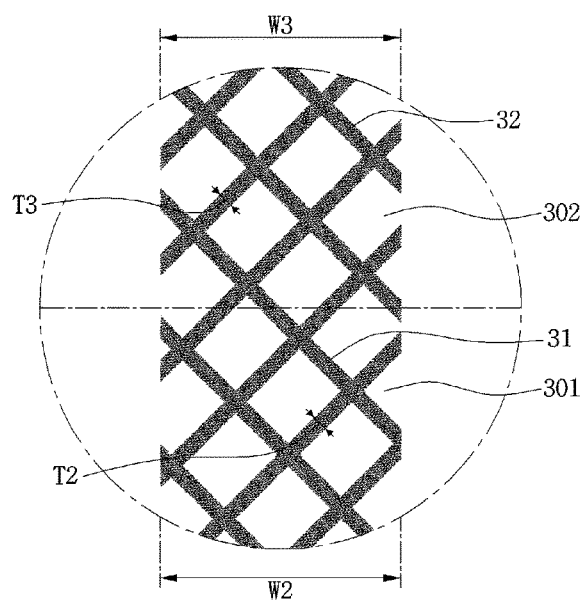

[Fig. 6]
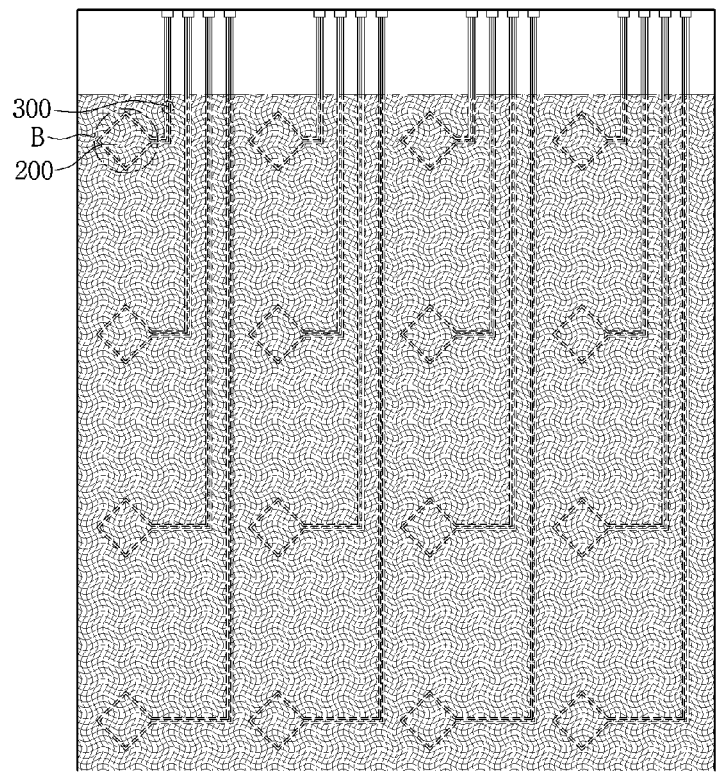
[Fig. 7]
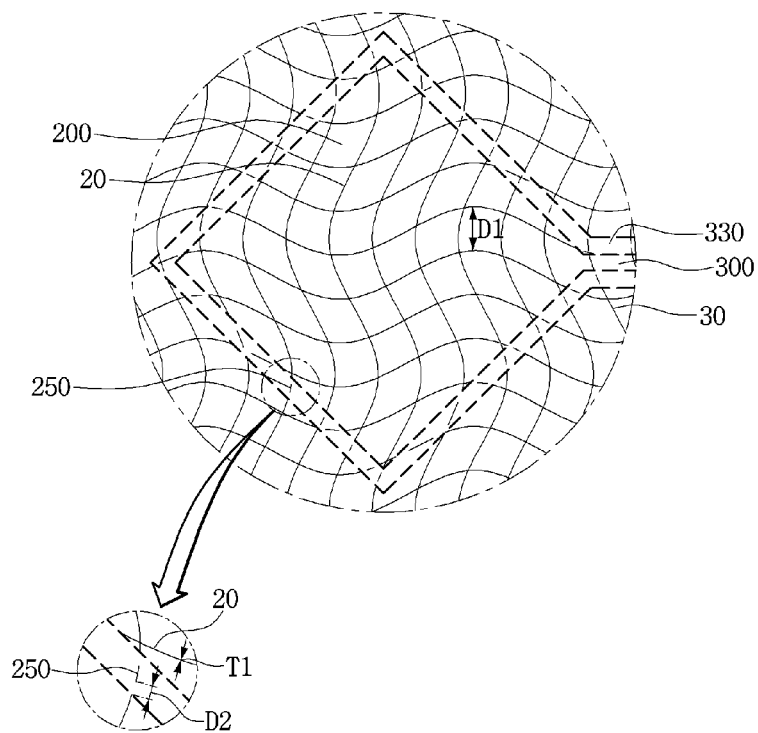

[Fig. 8]
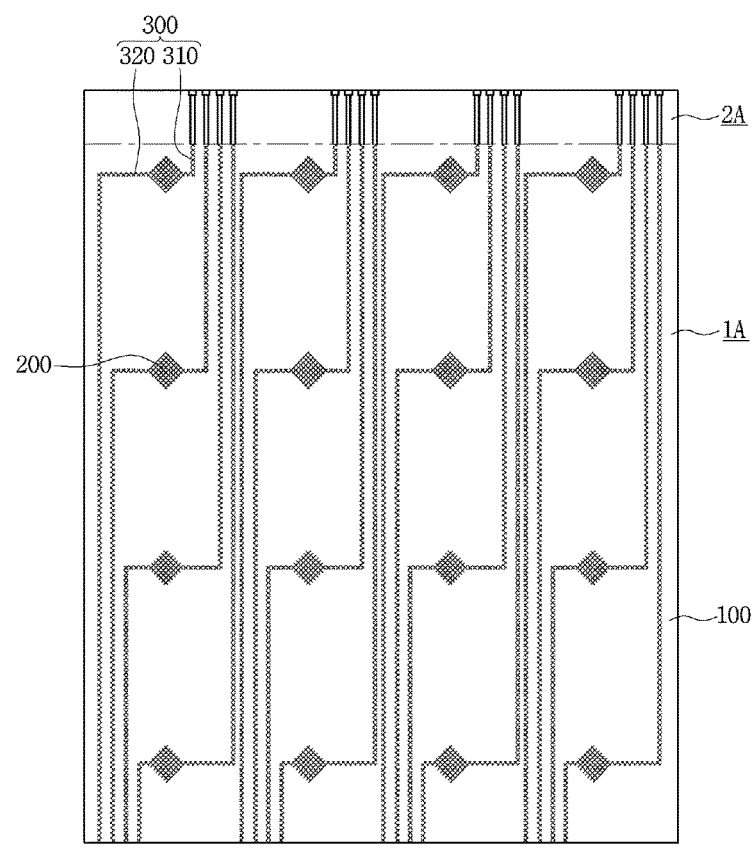
[Fig. 9]
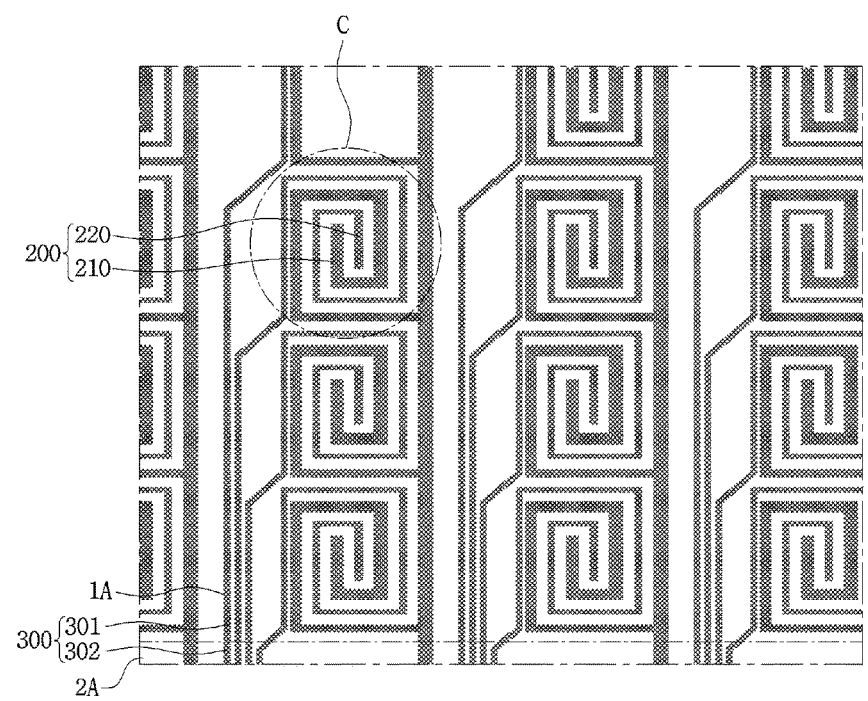

[Fig. 10]
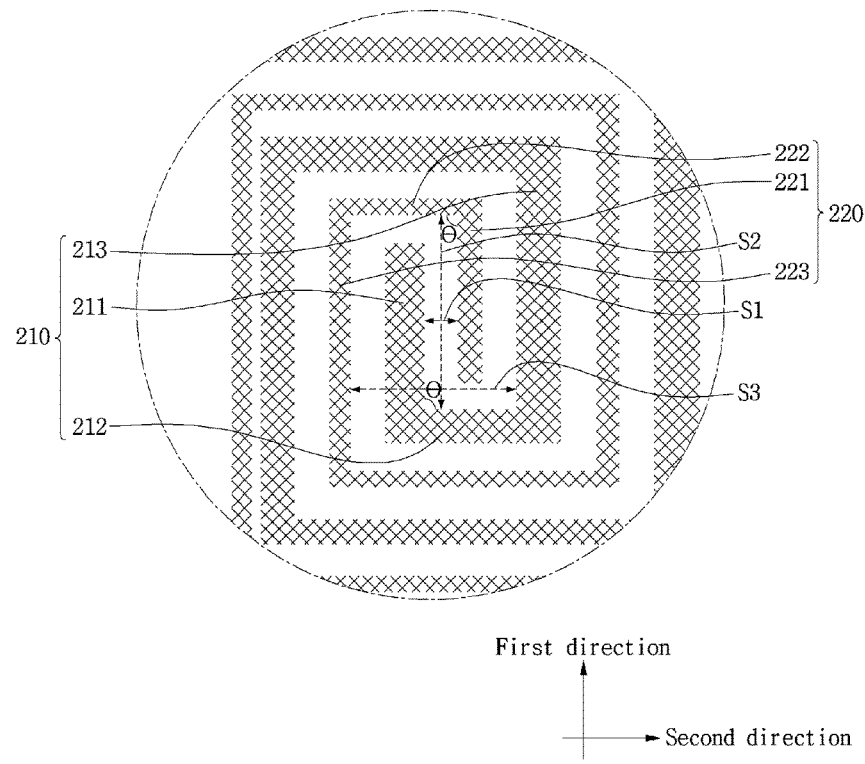
First direction
Second direction
[Fig. 11]
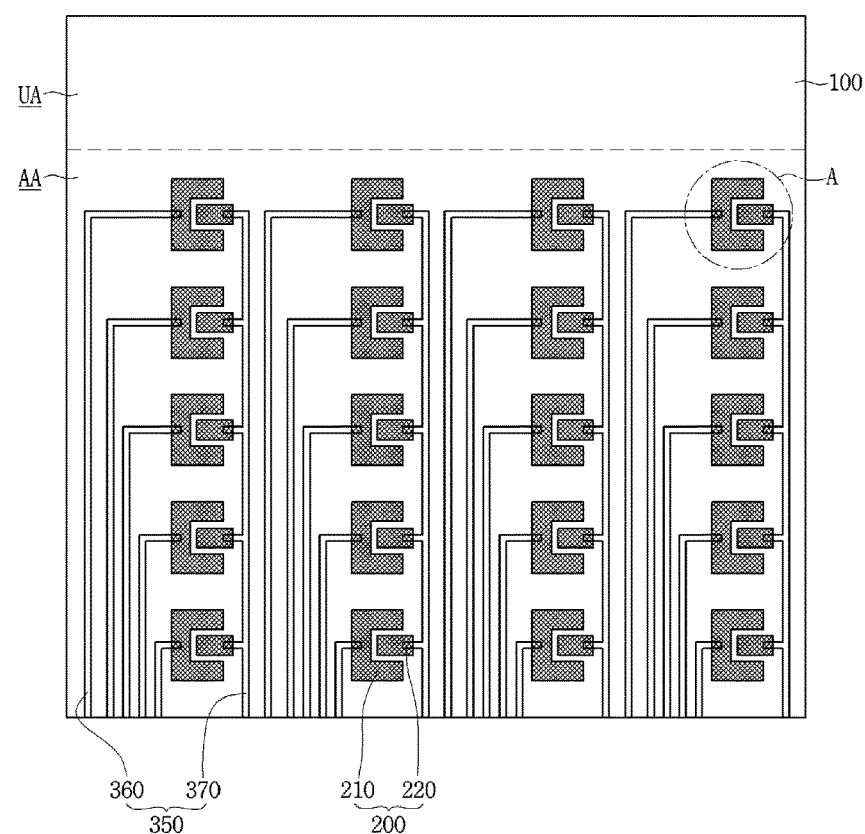

[Fig. 12]
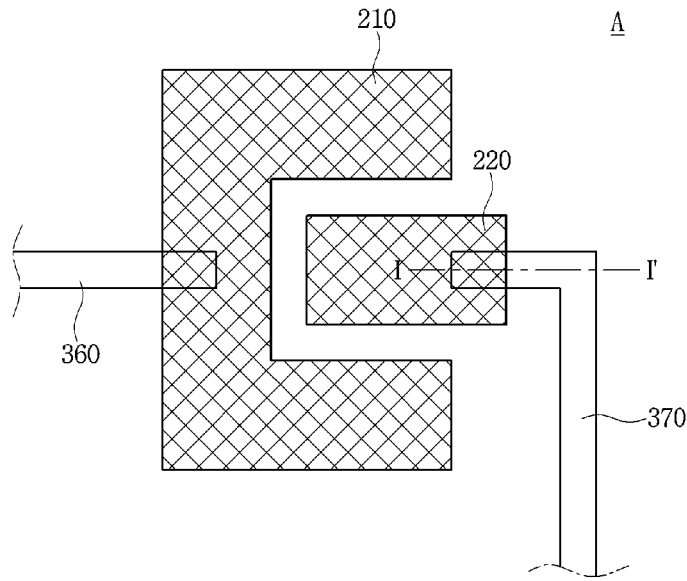
[Fig. 13]
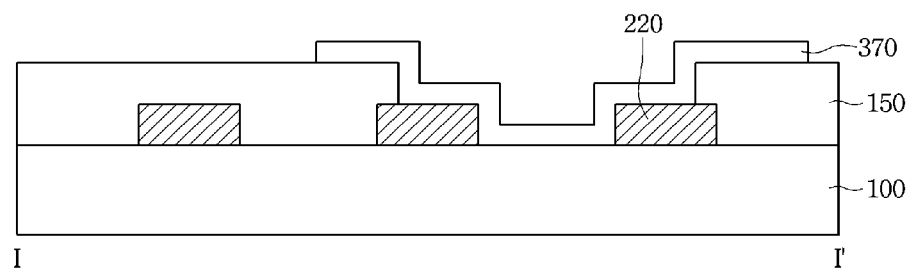
[Fig. 14]
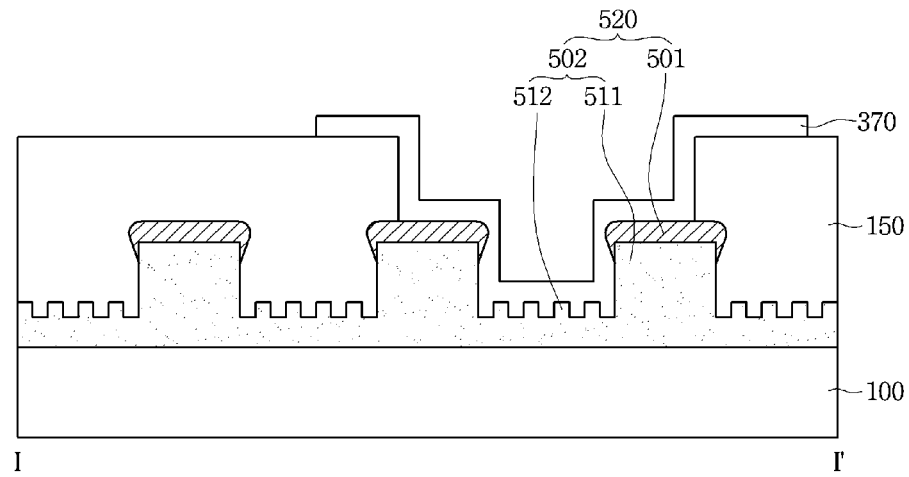

[Fig. 15]
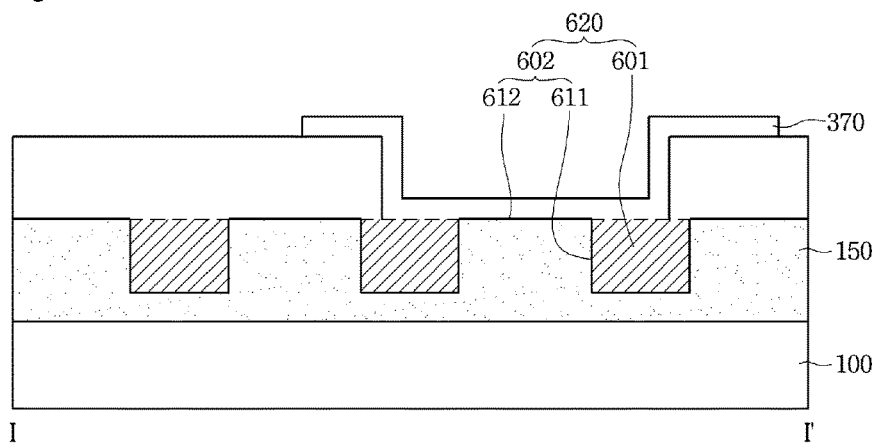
[Fig. 16]
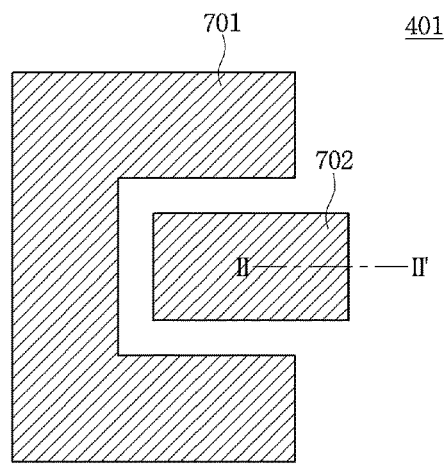
[Fig. 17]
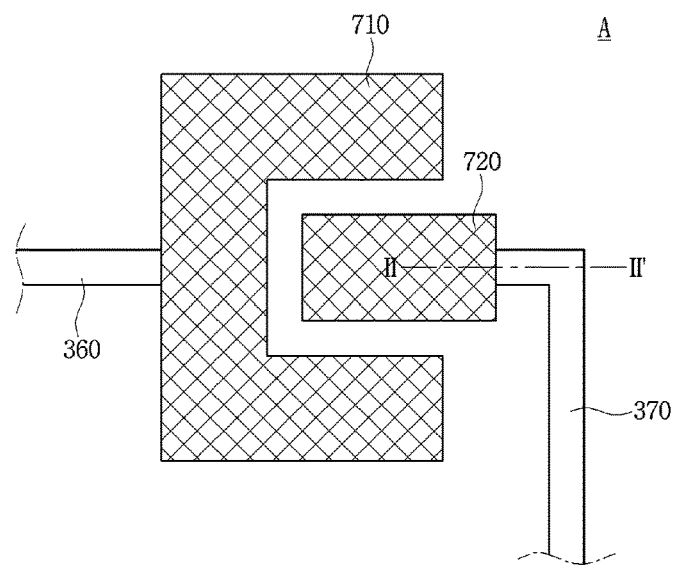

[Fig. 18]
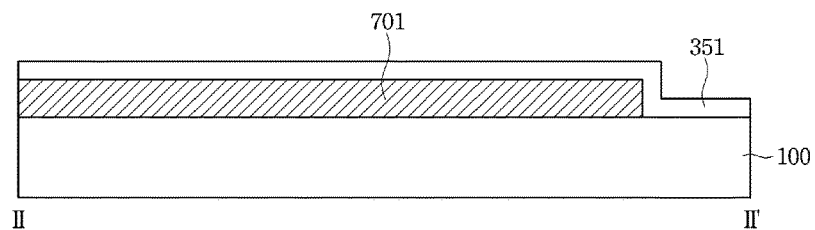
[Fig. 19]
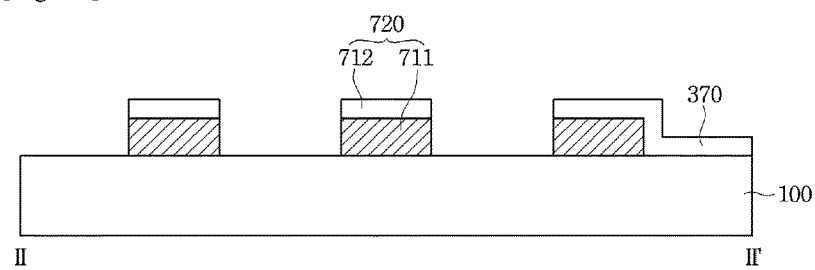
[Fig. 20]
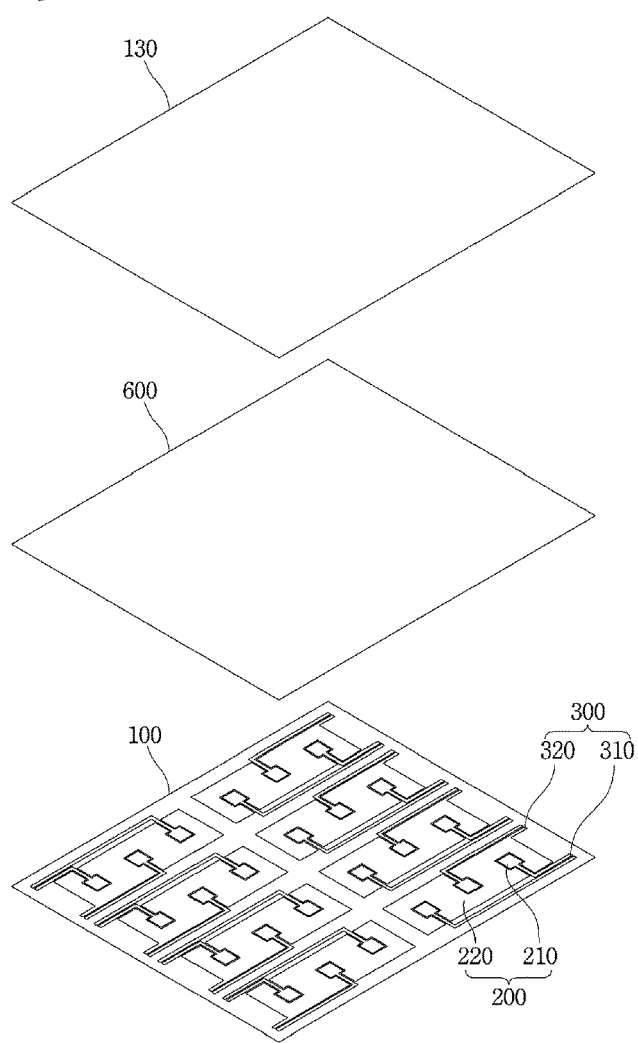

[Fig. 21]
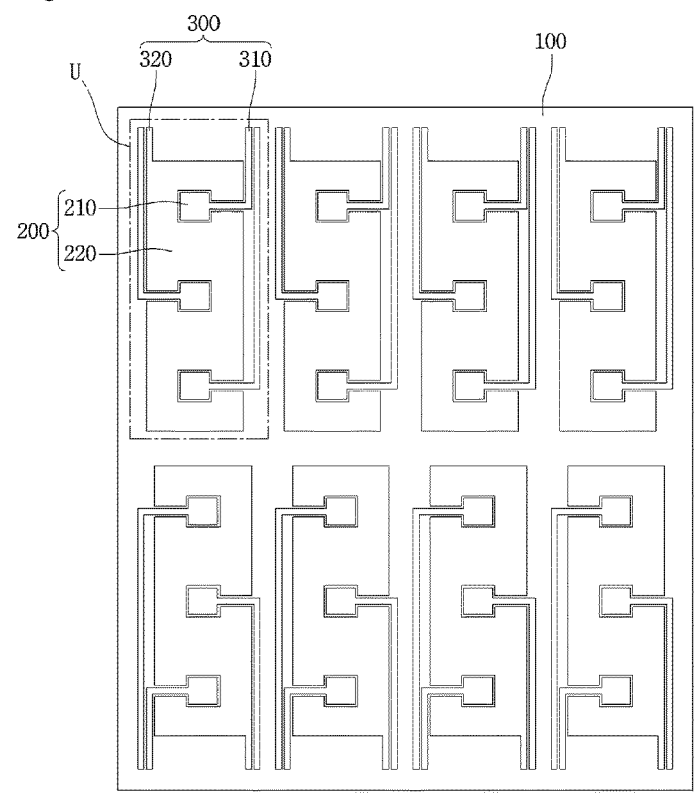
[Fig. 22]
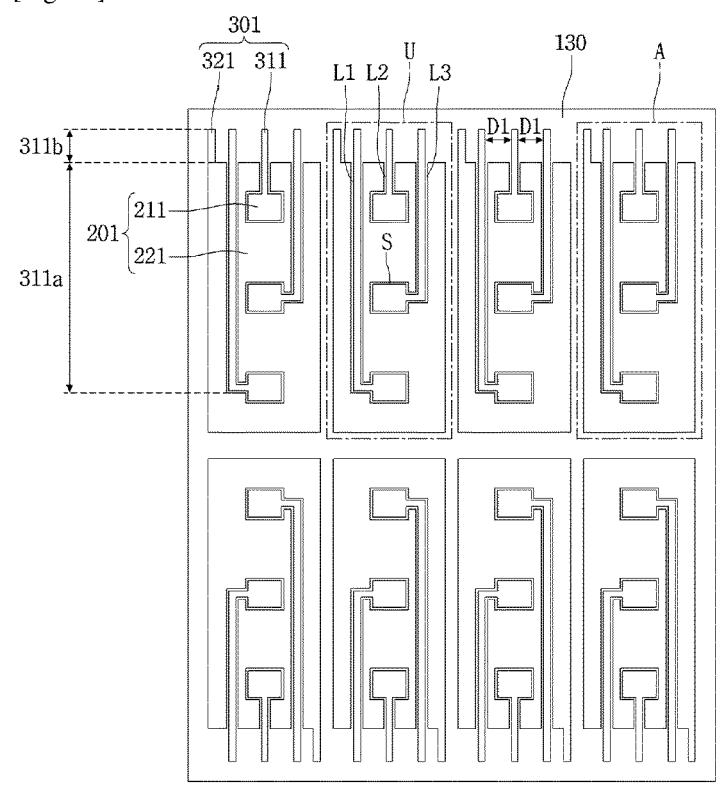

[Fig. 23]
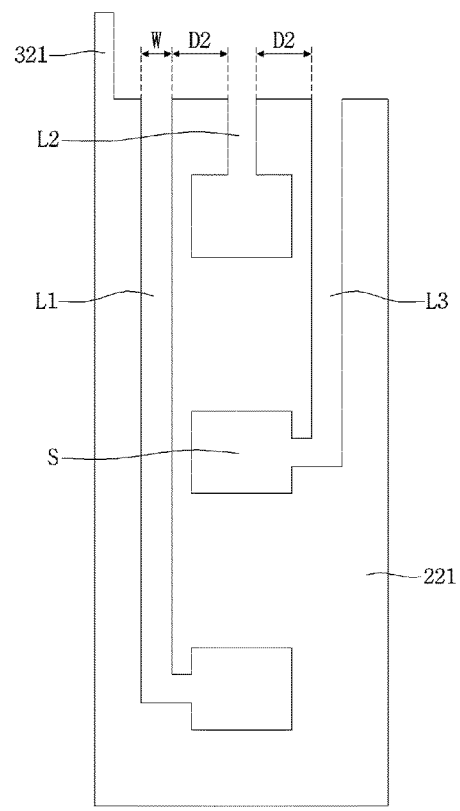
[Fig. 24]
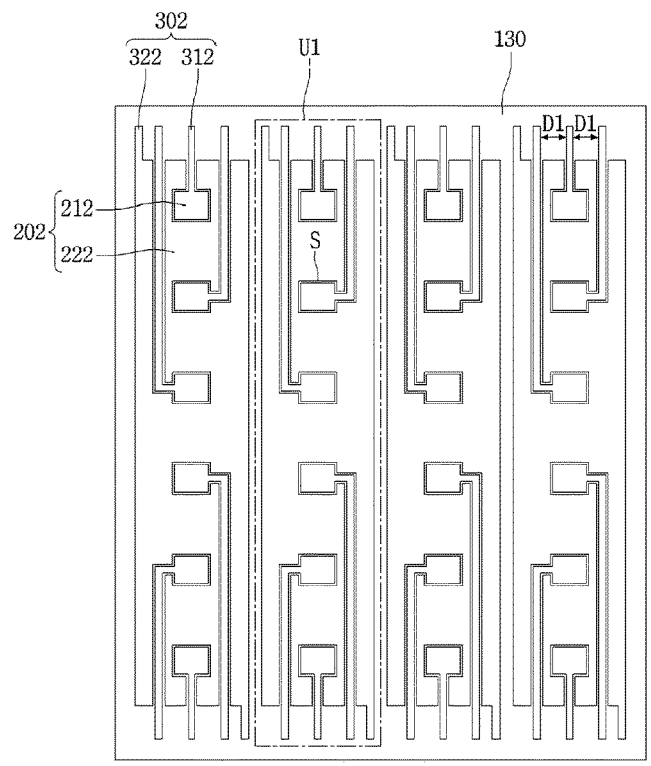

[Fig. 25]
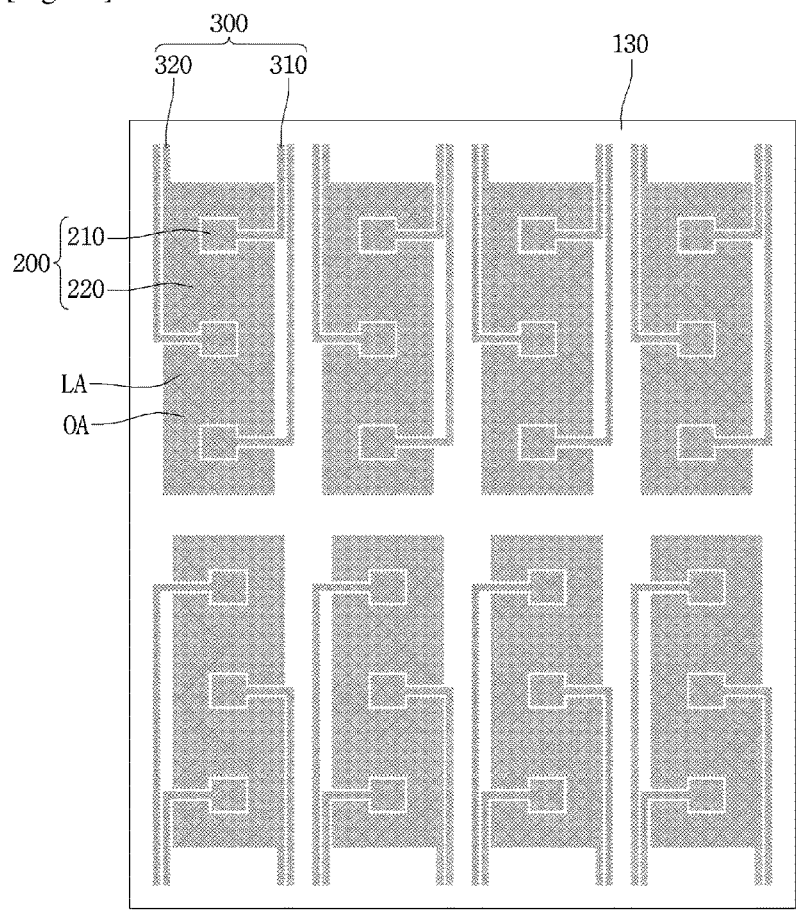
[Fig. 26]
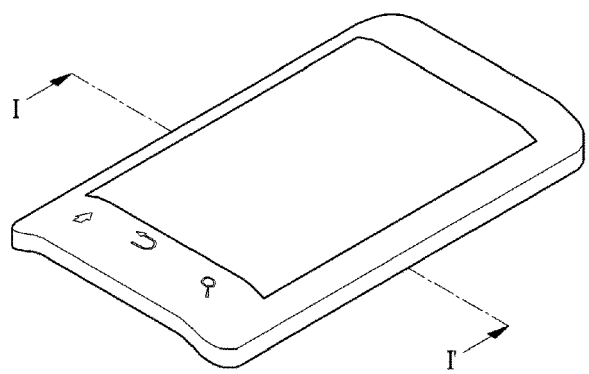
[Fig. 27]
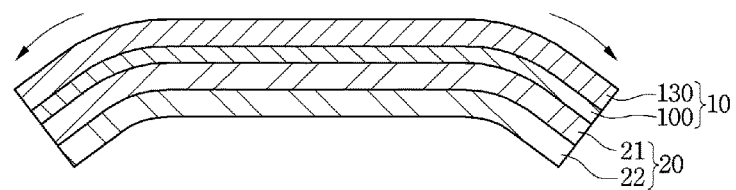

[Fig. 28]
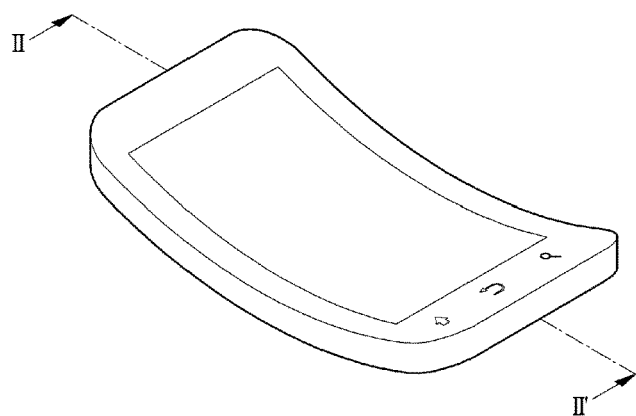
[Fig. 29]
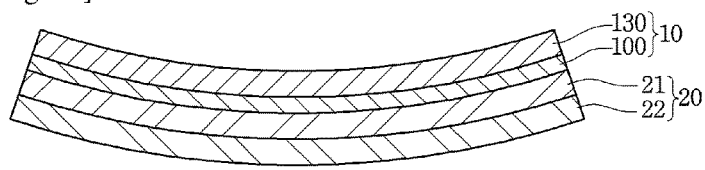
[Fig. 30]
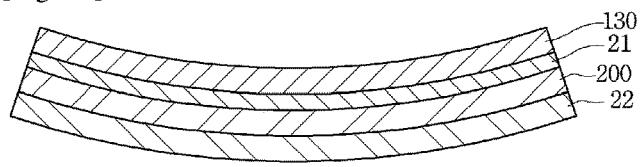
[Fig. 31]
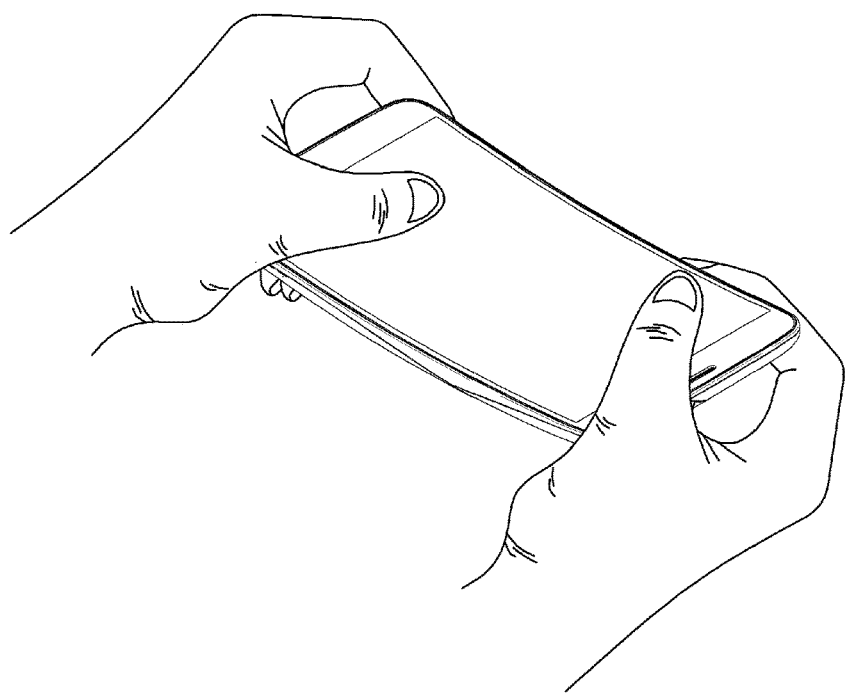

[Fig. 32]
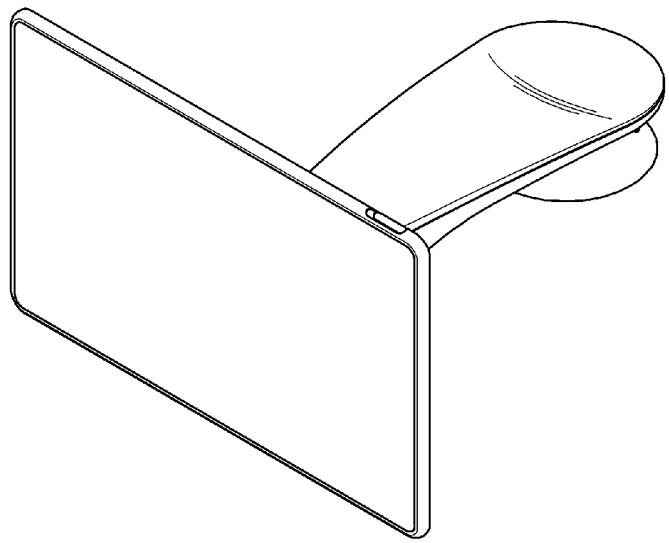
[Fig. 33]
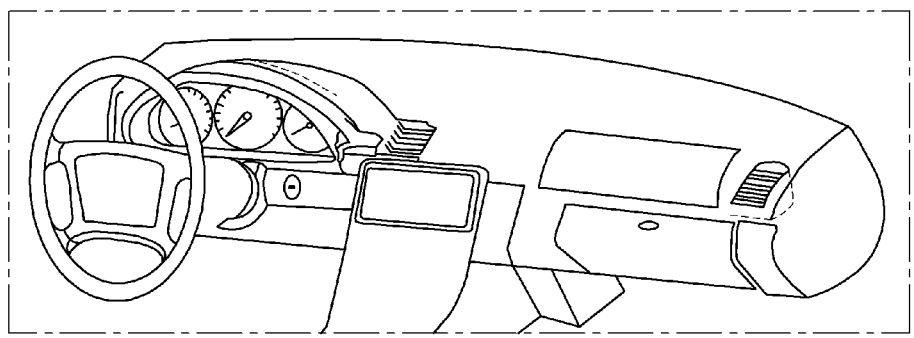

TOUCH WINDOW AND DISPLAY WITH THE SAME

CROSS REFERENCE TO RELATED APPLICATIONS

This application is the National Phase of PCT International Application No. PCT/KR2015/001794, filed on Feb. 25, 2015, which claims priority under 35 U.S.C. 119(a) to Patent Application Nos. KR 10-2014-0029593, filed in the Republic of Korea on Mar. 13, 2014, KR 10-2014-0042375, filed in the Republic of Korea on Apr. 9, 2014, and KR 10-2014-0052938, filed in the Republic of Korea on Apr. 30, 2014, all of which are hereby expressly incorporated by reference into the present application.

TECHNICAL FIELD

The disclosure relates to a touch window and a display including the same.

BACKGROUND ART

Recently, a touch window, which performs an input function through the touch of an image displayed on a display by an input device, such as a stylus pen or a finger, has been applied to various electronic appliances.

The touch window may be representatively classified into a resistive touch window and a capacitive touch window. In the resistive touch window, the position of the touch point is detected by detecting the variation of resistance according to the connection between electrodes when pressure is applied to the input device. In the capacitive touch panel, the position of the touch point is detected by detecting the variation of capacitance between electrodes when a finger of the user is touched on the capacitive touch panel. When taking into consideration the convenience of a fabrication scheme and a sensing power, the capacitive touch panel has been spotlighted in a smaller model touch panel recently.

Meanwhile, the demand for a flexible touch window has been increased recently. In other words, if the touch window is flexible or bendable, the experience of a user will extend. However, indium tin oxide (ITO), which is most extensively used a material for a transparent electrode of the touch panel, is easy to be physically damaged when the substrate is flexed and bent, so that the electrode property is deteriorated. Therefore, the indium tin oxide (ITO) is not suitable for a flexible device.

Meanwhile, the touch window includes a substrate having an active region to sense the position of an input device and an unactive region provided around the active region therein. In addition, the touch window includes an electrode part to sense the input device and a wire for the electrical connection of the electrode part. The electrode part is formed in the active region, and the wire is formed the active region or the unactive region.

In this case, the wire is generally formed of metal. When the wire is formed in the active region, transparency may not be ensured. Even if the metallic wire has a thin thickness, the total reflection and the vertically uniform shape of the metal make the metallic wire outstand, so that a problem may occur in visibility.

In addition, the whole thickness of a touch device needs to be reduces by reducing the thickness of the touch window.

DISCLOSURE OF INVENTION

Technical Problem

The embodiment provides a touch window having improved visibility and reliability and a display including the same.

Solution to Problem

Disclosed is a touch window including a substrate including a first region in which a touch is sensed and a second region provided at an edge of the first region, a sensing electrode to sense a touch position of the first region, and a wire connected with the sensing electrode. The wire includes comprises a first wire part provided in the first region and a second wire part provided in the second region.

According to the embodiment, there is provided a display including a touch window and a driving unit provided on the touch window. The touch window includes a substrate including a first region in which a touch is sensed and a second region provided at an edge of the first region, a sensing electrode to sense a touch position of the first region, and a wire connected with the sensing electrode. The wire includes a first wire part provided in the first region and a second wire part provided in the second region.

Advantageous Effects of Invention

As described above, according to the embodiment, the wire includes the conductive pattern, so that the pattern of the wire is not viewed in a screen region. In other words, even if the wire is formed of metal, the pattern may not be viewed. In addition, even if the wire is applied to the large-size touch window, the resistance of the touch window may be reduced. In addition, when the wire is formed through a printing process, the printing quality can be improved, so that the high-quality touch window can be ensured.

In addition, although the wire is provided in a non-screen region so that a Bezel region is widened according to the related art, the wire can be provided in the screen region so that the size of the Bezel can be reduced according to the embodiment. Accordingly, the screen region can be enlarged, and a wider screen can be ensured.

Further, both of the sensing electrode and the wire include conductive patterns, so that the bending characteristic and the reliability of the touch window can be improved.

Meanwhile, the sensing electrode of the touch window according to the embodiment includes the first and second sensing electrodes having the conductive pattern, and the first and second sensing electrodes may be provided on the same plane. In other words, the first and second sensing electrodes are provided on the same electrode substrate, so that the thickness of the touch window can be reduced, and the visibility can be improved. In other words, when the first and second sensing electrodes are provided on the electrode substrates different from each other, respectively, the thickness of the touch window can be increased. When viewed from the top, the conductive pattern of the first sensing electrode may overlap with the conductive pattern of the second sensing electrode so that a moire phenomenon may occur. According to the embodiment, the first and second sensing electrodes are provided on one plane to prevent the moire phenomenon.

In addition, the touch window of the embodiment can be formed with low resistance since the electrode part includes a metallic material, and a large-area touch window can be employed. Further, the electrode part includes a metallic material while the wire includes a transparent conductive material. According to the related art, even if metal is deposited at a thin thickness, the visibility problem occurs due to the vertically uniform shape. The wire according to the present invention includes a transparent conductive material, so that the transparency can be maintained in the touch window even if the wire is formed in the active region, so the visibility can be improved.

In addition, the first and second electrode parts are formed on the same plane. Accordingly, the thickness of the touch window can be more reduced as compared with the case that the first and second electrode parts are formed on different substrates, respectively, and combined with each other.

In addition, according to the embodiment, the first and second sensing electrodes are provided on the same plane, so that the thickness of the touch window can be reduced. In other words, the thickness of the touch window can be more reduced as compared with the case that the first and second sensing electrodes are formed on different substrates, respectively.

In addition, according to another embodiment, the first wire for the connection of the first sensing electrode is provided in the second sensing electrode, so that the array of the electrode units can be more densely achieved. In other words, since the first wire is provided in the second sensing electrode, a space can be efficiently used. Therefore, more many electrode units can be provided on the electrode substrate. Accordingly, the number of electrodes is increased, so that the accuracy can be improved when a position is sensed.

In addition, according to another embodiment, since the sensing electrode and the wire have a mesh shape, the patterns of the sensing electrode and the wire cannot be viewed in the active region. In other words, even if the sensing electrode and the wire include metal, the patterns cannot be viewed. In addition, even if the sensing electrode and the wire are applied to the large-size touch window, the resistance of the touch window can be reduced. In addition, when the sensing electrode and the wire are formed through the printing process, the printing quality can be improved, so that the high-quality window can be ensured.

In addition, the first and second sensing electrodes are provided on the same plane to improve the moire phenomenon so that the visibility can be improved. In other words, when the first and second sensing electrodes are provided on different electrode substrates, respectively, the conductive pattern of the first sensing electrode and the conductive pattern of the second sensing electrode overlap with each other when viewed from the top, so that the moire phenomenon may occur. However, according to the embodiment, the first and second sensing electrodes are provided on one plane to prevent the moire phenomenon.

BRIEF DESCRIPTION OF DRAWINGS

FIG. 1 is an exploded perspective view showing a touch window according to the embodiment.

FIG. 2 is a plan view showing the touch window according to the embodiment.

FIGS. 3 and 4 are plan views showing a touch window according to another embodiment.

FIG. 5 is an enlarged view showing a part A of FIG. 4.

FIG. 6 is a plan view showing a touch window according to another embodiment.

FIG. 7 is an enlarged view showing a part B of FIG. 6.

FIGS. 8 and 9 are plan views showing a touch window according to another embodiment.

FIG. 10 is an enlarged view showing a part C of FIG. 9.

FIG. 11 is a plan view showing a touch window according to another embodiment.

FIG. 12 is a plan view showing a region A of FIG. 11.

FIG. 13 is a sectional view taken along line I-I' of FIG. 12.

FIG. 14 is a sectional view showing a touch window according to another embodiment.

FIG. 15 is a sectional view showing a touch window according to another embodiment.

FIGS. 16 and 17 are plan views showing a method of fabricating a touch window according to still another embodiment.

FIGS. 18 and 19 are sectional views showing a method of fabricating the touch window according to still another embodiment.

FIG. 20 is an exploded perspective view showing a touch window according to another embodiment.

FIG. 21 is a plan view showing a touch window according to another embodiment.

FIG. 22 is a plan view showing a touch window touch window according to another embodiment.

FIG. 23 is an enlarged view showing a second sensing electrode provided in a region A of FIG. 22.

FIGS. 24 and 25 are plan view showing a touch window according to still another embodiment.

FIG. 26 is a perspective view showing a display according to the embodiment.

FIG. 27 is a sectional view taken along line I-I' of FIG. 26.

FIG. 28 is a perspective view showing a display according to another embodiment.

FIG. 29 is a sectional view taken along line II-IF of FIG. 28.

FIGS. 30 to 33 are perspective view showing a display according to various embodiments.

MODE FOR THE INVENTION

In the following description of the embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

In the following description, when a part is connected to the other part, the parts are not only directly connected to each other, but also indirectly connected to each other while interposing another part therebetween. In addition, when a predetermined part "includes" a predetermined component, the predetermined part does not exclude other components, but may further include other components unless otherwise indicated.

The thickness and size of each layer (or film), each region, each pattern, or each structure shown in the drawings may be modified for the purpose of convenience or clarity of the explanation. In addition, the size of elements does not utterly reflect an actual size.

Hereinafter, the embodiment of the present invention will be described with reference to accompanying drawings.

Hereinafter, a touch window according to the embodiment will be described in detail with reference to FIGS. 1 and 2. The touch window according to the embodiment may include a curved touch window or a flexible touch window that may be bent. In addition, the touch window may be curved or bended. Accordingly, the touch window according to the embodiment can be easily carried by a user and may be modified to touch windows having various designs.

The touch window according to the embodiment may include a cover substrate 130, a substrate 100, a sensing electrode 200 provided on the substrate 100, a wire 300, a second electrode substrate 110 provided on the substrate 100, a sensing electrode 280 provided on the second electrode substrate 110, and a wire 370.

The cover substrate 130 may be a curved cover substrate or flexible cover substrate.

The cover substrate 130 may include glass. In detail, the cover substrate 130 includes chemically tempered glass. The chemically tempered glass may include glass that is chemically tempered. For example, the chemically tempered glass may include chemically tempered/semi-tempered glass, such as soda lime glass or aluminosilicate glass, reinforced/flexible plastic, such as polyimide (PI), polyethylene terephthalate (PET), propylene glycol (PPG), or poly carbonate (PC), or sapphire. The sapphire has superior electric characteristics, such as permittivity, so that a touch response speed may be greatly increased and a space touch such as hovering may be easily implemented. In addition, since the sapphire has high surface hardness, the sapphire is a material applicable to a cover substrate. The hovering refers to a technique of recognizing coordinates even at a slight distance from a display. Meanwhile, the cover substrate 130 may include a plastic film. The cover substrate 130 includes a film, so that the thickness of the touch window can be reduced.

The cover substrate 130 may have predetermined hardness to protect the sensing electrode 200 and the wire 300.

The substrate 100 may be provided under the cover substrate 130. An optical clear adhesive 600 may be further interposed between the cover substrate 130 and the sensing electrode 200.

The sensing electrode 200 may be formed on the substrate 100. The sensing electrode 200 may sense the touch by an input unit such as a finger.

The substrate 100 may include rigid or flexible. For example, the substrate 100 may include glass or plastic. In detail, the substrate 100 chemically tempered/semi-tempered glass, such as soda lime glass or aluminosilicate glass, reinforced/flexible plastic, such as polyimide (PI), polyethylene terephthalate (PET), propylene glycol (PPG), or poly carbonate (PC), or sapphire.

In addition, the substrate 100 may include an optically isotropic film. For example, the substrate 100 may include COC (cyclic olefin copolymer), COP (cyclic olefin polymer), PC (polycarbonate) OR PMMA (polymethyl methacrylate).

The sapphire has superior electric characteristics, such as permittivity, so that a touch response speed may be greatly increased and a space touch such as hovering may be easily implemented. In addition, since the sapphire has high surface hardness, the sapphire is a material applicable to a cover substrate. The hovering refers to a technique of recognizing coordinates even at a slight distance from a display.

In addition, the substrate 100 may be bent while a portion of the substrate 100 has a curved surface. In other words, the substrate 100 may be bent while a portion of the substrate 100 has a flat surface and another portion of the substrate 100 has a curved surface. In detail, the substrate 100 may be bent or curved while an end portion of the substrate 100 has a curved surface, or has a surface with a random curvature.

In addition, the substrate 100 may be a flexible substrate having a flexible property.

In addition, the substrate 100 may be a curved substrate or a bended substrate. In other words, the touch window including the substrate 100 may have a flexible, curving, or bending characteristic. Accordingly, the touch window according to the embodiment can be easily carried by a user and may be modified to various designs.

The substrate 100 may be provided thereon with a sensing electrode, a wire electrode, and a printed circuit board. The substrate 100 may be a support substrate.

The substrate 100 may include a cover substrate. In other words, the sensing electrode, the wire electrode, and the printed circuit board may be supported by the cover substrate. In addition, the cover substrate 130 may be additionally provided on the substrate 100. In other words, the sensing electrode, the wire electrode, and the printed circuit board are supported by the substrate 130, and the substrate 100 and the cover substrate 130 may be combined (bonded) with each other through the adhesive layer.

The substrate 100 may have a first region 1A and a second region 2A defined therein.

The first region 1A refers to a region where a touch instruction of a user can be input. In other words, the first region 1A is a region where a touch is sensed.

Alternatively, an image may be displayed in the first region 1A, and may not be displayed in the second region 2A provided at a peripheral portion of the first region 1A.

The second region 2A may be provided at an outer portion of the first region 1A. The second region 2A may be provided therein with an external circuit connected with the wire 300. In other words, the second region 2A is provided at an edge of a screen region, so that a screen image is not displayed in the second region 2A. If necessary, a touch may be detected even in the second region 2A.

The outer dummy layer is formed in the second region 2A. The outer dummy layer may be coated with a material having a predetermined color so that the wires 300 and a printed circuit board connecting the wires 300 to external circuits cannot be viewed from the outside. The outer dummy layer may have a color suitable for a desired outer appearance thereof. For example, the outer dummy layer includes black pigments to represent black. The outer dummy layer may be formed through deposition, print, and wet coating schemes.

The first region 1A may be provided therein with the sensing electrode 200. The sensing electrode 200 may include a plurality of sensing parts 201, 202, and 203. The sensing parts 201, 202, and 203 may sense positions.

The sensing electrode may include a transparent conductive material allowing the flow of electricity without the interruption of light transmission. For example, the sensing electrode may include metallic oxides, such as indium tin oxide, indium zinc oxide, copper oxide, tin oxide, zinc oxide, and titanium oxide. According to the embodiment, the sensing electrode 200 may include a first conductive pattern. For example, the sensing electrode 200 may be provided in the mesh shape. In this case, the mesh pattern may be formed in random to prevent a moire phenomenon. The moire phenomenon occurs when periodical stripes overlap with each other. Since adjacent stripes overlap with each other, a thickness of a stripe is thickened so that the stripe is spotlighted as compared with other stripes. Thus, in order to prevent such a moire phenomenon, the conductive pattern may be provided in various shapes.

In detail, the sensing electrode 200 includes a conductive pattern opening part OA and a conductive pattern line part LA. Conductive pattern lines 20 are provided in the conductive pattern line part LA. In this case, a line width T1 of the conductive pattern line part LA may be in the range of 0.1 µm to 10 µm. The conductive pattern line part having the line width T1 of 0.1 µm or less may not be fabricated. If the line width T1 is 10 µm or less, the pattern of the sensing electrode 200 may not be viewed. The line width T1 of the conductive pattern line part LA may be in the range of 0.1 µm to 10 µm. Preferably, the line width of the conductive pattern line part LA may be in the range of 0.5 µm to 7 µm. More preferably, the line width of the conductive pattern line part may be in the range of about 1 µm to about 3.5 µm.

Meanwhile, as shown in FIG. 2, the first conductive pattern may have a regular shape. In other words, the conductive pattern opening part OA may have a rectangular shape. However, the embodiment is not limited thereto, but the conductive pattern opening part OA may have various shapes including a polygonal shape, such as a rectangular shape, a diamond shape, a pentagonal shape, or a hexagonal shape, or a circular shape.

In addition, the embodiment is not limited thereto, but the conductive pattern may have a regular shape. In other words, conductive pattern opening parts may be variously provided in one conductive pattern. Therefore, the sensing electrode 200 may include a conductive pattern opening part having various shapes.

As the sensing electrode 200 has a mesh shape, the pattern of the sensing electrode 200 may not be viewed in the first region 1A. In other words, even if the sensing electrode 200 is formed of metal, the pattern may not be viewed. In addition, even if the sensing electrode 200 is applied to a large-size touch window, the resistance of the touch window may be lowered. In addition, when the sensing electrode 200 is formed through a printing process, the printing quality can be improved, so that a high-quality touch window can be ensured. The sensing electrode 200 may include a nanowire, a photosensitive nanowire film, carbon nanotube (CNT), graphene, conductive polymer, and the combination thereof. In addition, the sensing electrode 200 may include at least one of chromium (Cr), nickel (Ni), copper (Cu), aluminum (Al), silver (Ag), molybdenum (Mo), gold (Au), titanium (Ti), and the alloy thereof. The materials have flexible characteristics applicable of the curving and the bending of the substrate.

The wire 300 may be formed in the first and second regions 1A and 2A for the electrical connection with the sensing electrode 200.

The wire 300 may include a first wire part 301 provided in the first region 1A and a second wire part 302 provided in the second region 2A.

The line width of the first wire part 301 provided in the first region 1A may be at least equal to or less than that of the line width of the second wire part 302. For example, the ratio of the width of the first wire part 301 to the width of the second wire part 302 may be in the range of 1:1 to 1:5. Accordingly, the first wire part 301 may not be viewed in the first region 1A. In addition, when the second wire part 302 is connected with a printed circuit board, the contact area between the second wire part 302 and the printed circuit board may be increased.

At least one of the first and second wire parts 301 and 302 may include a conductive pattern. For example, as shown in FIG. 2, the first wire part 301 may include a conductive pattern. The first wire part 301 may include a first conductive pattern. In other words, the first wire part 301 may include the same conductive pattern as that of the sensing electrode 200.

In detail, the wire 300 includes a conductive pattern opening part OA and a conductive pattern line part LA. Conductive pattern lines 31 are provided in the conductive pattern line part LA. In this case, a line width of the conductive pattern line part LA may be in the range of 0.1 µm to 10 µm. The conductive pattern line having the line width of 0.1 µm or less may not be fabricated. If the line width is 10 µm or less, the pattern of the wire 300 may not be viewed. Preferably, the line width of the conductive pattern line part LA may be in the range of 0.1 µm to 10 µm. Preferably, the line width of the conductive pattern line part LA may be in the range of 0.5 µm to 7 µm. More preferably, the line width of the conductive pattern line part may be in the range of about 1 µm to about 3.5 µm.

Meanwhile, as shown in FIG. 2, the conductive pattern may have a regular shape. In other words, the conductive pattern opening part OA may have a rectangular shape. However, the embodiment is not limited thereto, but the conductive pattern opening part OA may have various shapes including a polygonal shape, such as a diamond shape, a pentagonal shape, or a hexagonal shape, or a circular shape.

In addition, the embodiment is not limited thereto, but the conductive pattern may have an irregular shape. In other words, various conductive pattern opening parts may be provided in one conductive pattern. Accordingly, the wire 300 may include a conductive pattern opening part having various shapes.

The first wire part 301 includes conductive patterns densely provided, so that the pattern of the first wire part 301 may not be viewed from the first region 1A. In other words, even if the first wire part 301 is formed of metal, the pattern may not be viewed. In addition, even if the first wire part 301 is applied to a large-size touch window, the resistance of the touch window may be lowered. In addition, when the first wire part 301 is formed through the printing process, the printing quality can be ensured, so that the high-quality touch window can be ensured.

In addition, conventionally, when the wire is provided in the second region 2A serving as a non-screen region, a Bezel is widened. According to the embodiment, since the wire 300 may be provided in the first region 1A serving as a screen region, the size of the Bezel can be reduced. Accordingly, the screen region can be ensured, so that a wider screen image can be ensured.

In addition, both of the sensing electrode 200 and the wire 300 include conductive patterns, so that the bending characteristic and the reliability of the touch window can be improved.

The wire 300 may include the same material to that of the sensing electrode 200 and a material similar to that of the sensing electrode 200. The wire 300 may include a nanowire, a photosensitive nanowire film, carbon nanotube (CNT), graphene, conductive polymer, and the combination thereof. In addition, the wire 300 may include at least one of chromium (Cr), nickel (Ni), copper (Cu), aluminum (Al), silver (Ag), molybdenum (Mo), gold (Au), titanium (Ti), and the alloy thereof. The materials have flexible characteristics applicable to the curving and the bending of the substrate.

An electrode pad 400 may be provided at one end portion of the wire 300. The electrode pad 400 may be connected with a printed circuit board 700. In detail, although not shown, a connector may be positioned on one surface of the printed circuit board 700, and the electrode pad 400 may be connected with the connector. The electrode pad 400 may have a size corresponding to the connector.

The printed circuit board 700 may include various types of printed circuit boards. For example, the printed circuit board may include flexible printed circuit board (FPCB).

Meanwhile, although FIG. 2 shows only the sensing electrode 200 and the wire 300 provided on the substrate 100 and the description thereof has been made, a sensing electrode 270 and a wire 370 the same as or similar to those of the sensing electrode 200 and the wire 300 may be provided on the second electrode substrate 110.

The sensing electrode 200 provided on the substrate 100 and the sensing electrode 270 provided on the second electrode substrate 110 may be a driving electrode to transmit a signal and a receiving electrode to receive a signal, respectively.

Hereinafter, a touch window according to another embodiment will be described with reference to FIG. 3. In the following of the touch window according to another embodiment, the details of structures or elements the same as or similar to those of the above-described touch window according to previous embodiments will be omitted, and the same reference numerals will be assigned to the same elements.

Referring to FIG. 3, the sensing electrode 200 and the wire 300 may include conductive patterns. In this case, the conductive patterns may be patterns formed by mixing various-shaped curved lines and linear lines with each other. The sensing electrode 200 and the wire 300 are provided in a mesh shape having a curved line to prevent a moire phenomenon. In addition, according to the embodiment, the moire phenomenon can be compensated without an additional haze film. In addition, the moire phenomenon can be prevented without the thickness increase and the loss of the transmittance. Accordingly, the whole performance and the reliability of the display can be improved.

Meanwhile, referring to FIGS. 4 and 5, in a touch window according to another embodiment, even a second wire part 302 may include a conductive pattern.

The first wire part 301 may include a first conductive pattern, and the second wire part 302 may include a second conductive pattern.

A line width T2 of the first conductive pattern 31 provided in the first region 1A may be at least equal to or narrower than a line width T3 of the second conductive pattern 32. For example, a ratio of the line width T2 of the first conductive pattern to the line width T3 of the second conductive pattern may be in the range of 1:1 to 1:5. Accordingly, the first wire part 301 may not be viewed in the first region 1A. In addition, when the second wire part 302 is connected with a printed circuit board, the contact area may be increased.

A width W2 of the first wire part 301 provided at the first region 1A may be at least equal to or narrower than a width W3 of the second wire part 302. For example, the ration of the width W2 of the first wire part 301 to the width W3 of the second wire part 302 may be in the range of 1:1 to 1:5. Accordingly, the first wire part 301 may not be viewed in the first region 1A. In addition, when the second wire part 302 is connected with a printed circuit board, the contact area may be increased.

Meanwhile, referring to FIGS. 6 and 7, in a touch window according to another embodiment, a dummy pattern 250 may be provided adjacent to the first conductive pattern 20. In the following of the touch window according to another embodiment, the details of structures or elements the same as or similar to those of the above-described touch window according to previous embodiments will be omitted, and the same reference numerals will be assigned to the same elements.

The dummy pattern 250 may be provided in a shorted part 330. The pattern of the sensing electrode 200 may be formed through the shorted part 330. Therefore, the short parted 330 may be provided adjacent to the sensing electrode 200.

An interval D2 between the dummy pattern 250 and the first conductive pattern 20 may be greater than the line width of the conductive pattern 20 and may be less than an interval D1 between the conductive patterns 20. For example, the interval D2 between the dummy pattern 250 and the first conductive pattern 20 may be in the range of 1 μm to 500 μm.

According to the embodiment, the dummy pattern 250 is provided, so that the electrical characteristic of the sensing electrode 200 and the visibility of the touch window can be improved. Accordingly, the reliability of the touch window can be improved.

Referring to FIG. 8, in a sensing part of the touch window according to another embodiment, a plurality of wires 310 and 320 may be connected with each other. In the following of the touch window according to another embodiment, the details of structures or elements the same as or similar to those of the above-described touch window according to previous embodiments will be omitted, and the same reference numerals will be assigned to the same elements.

In detail, the wires 310 and 320 may include a first connection wire 310 connected with one end of the sensing part and a second connection wire 310 connected with an opposite end of the sensing part. In other words, the wires 310 and 320 may be connected with each other through a double routing scheme. Therefore, the line resistance of the wires 310 and 320 may be reduced, so that the efficiency of the window can be improved. In addition, according to the embodiment, the wires 310 and 320 include conductive patterns and are provided in the first region 1A, so that the wires 310 and 320 may be formed without the increase of the Bezel.

Meanwhile, the first connection wire 310 may be withdrawn through an upper end of the substrate 100. The second connection wire 320 may be withdrawn through a lower end of the substrate 100. In other words, the first and second connection wires 310 and 320 may be withdrawn in different directions, respectively. Therefore, the first and second connection wires 310 and 320 may be connected with different printed circuit boards, respectively. The first printed circuit board connected with the first connection wire 310 and the second printed circuit board connected with the second connection wire 320 may be further provided.

Referring to FIGS. 9 and 10, the sensing electrode 200 may include first and second sensing electrodes 210 and 220 having conductive patterns, and the first and second sensing electrodes 210 and 220 may be provided on the same plane. In other words, as the first and second sensing electrodes 210 and 220 may be provided on the same substrate 100, the thickness of the touch window can be reduced, and the visibility can be improved. In other words, when the first and second sensing electrodes 210 and 220 may be provided on different electrode substrates, respectively, the thickness of the touch window can be increased. When viewed from the top, the conductive pattern of the first sensing electrode 210 and the conductive pattern of the second sensing electrode 220 may overlap with each other, so that a moire phenomenon may occur. However, according to the embodiment, the first and second sensing electrodes 210 and 220 may be provided on one plane to prevent the moire phenomenon.

The first and second sensing electrodes 210 and 220 may face each other.

In detail, the first sensing electrode 210 may include a first sensing part 211, a second sensing part 212, and a third sensing part 213. The first and second sensing parts 211 and 212 may extend with mutually different directionalities. For example, the first sensing part 211 may extend in a first direction, and the second sensing part 212 may extend in a second direction crossing the first direction. The second sensing part 212 may extend from the first sensing part 211. In this case, the angle (θ) between the first and second sensing parts 211 and 212 may be 90° or less. In detail, the angle between the first and second sensing parts 211 and 212 may be in the range of 10° to 90°.

Meanwhile, the third sensing part 213 may extend from the second sensing part 212, and may have a directionality different from that of the second sensing part 212. The third sensing part 213 may extend in the first direction. In this case, the angle between the second sensing part 212 and the third sensing part 213 may be 90° or less. In detail, the angle between the second and third sensing parts 212 and 213 may be in the range of 10° to 90°.

A plurality of sensing parts may extend from the third sensing part 213 with the above regularity.

Similarly, the second sensing electrode 220 may include a fourth sensing part 221, a fifth sensing part 222, and a third sensing part 223. The fourth and fifth sensing parts 221 and 222 may extend with mutually different directionalities. For example, the fourth sensing part 221 may extend in the first direction, and the fifth sensing part 222 may extend in the second direction crossing the first direction. The fifth sensing part 222 may extend from the fourth sensing part 221. In this case, the angle (θ) between the fourth sensing part 221 and the fifth sensing part 222 may be 90° or less. In detail, the angle (θ) between the fourth and fifth sensing parts 221 and 222 may be in the range of 10° to 90°.

Meanwhile, the third sensing part 223 may extend from the fifth sensing part 222, and may have a directionality different from that of the fifth sensing part 222. The third sensing part 223 may extend in the first direction. In this case, the angle (θ) between the fifth and third sensing parts 222 and 223 may be 90° or less. In detail, the angle (θ) between the fifth sensing part 222 and the third sensing part 223 may be in the range of 10° to 90°.

A plurality of sensing parts may extend from the third sensing part 223 with the above regularity.

The first sensing part 211 and the fourth sensing part 221 may face each other and may be spaced apart from each other by a first interval. The second sensing part 212 and the fifth sensing part 222 may face each other and may be spaced apart from each other by a second interval greater than the first interval. The third sensing part 213 and the third sensing part 223 may face each other and may be spaced apart from each other by a third interval greater than the second interval.

Hereinafter, a touch window according to another embodiment will be described with reference to FIGS. 11 to 13. In the following of the touch window according to the embodiment, the details of structures or elements the same as or similar to those of the above-described touch window according to previous embodiments will be omitted, and the same reference numerals will be assigned to the same elements.

Referring to FIGS. 11 to 13, the touch window according to the embodiment may include a substrate 100, a sensing electrode 200, and a wire 300. The sensing electrode 200 and a wire 350 may be provided on one surface of the substrate 100 in the second region 2A. The sensing electrode 200 may be formed in the first region 1A to sense an input device. The wire 350 may be formed in the first region 1A for the electrical connection with the sensing electrode 200, and may extend to the second region 2A for the connection with an external circuit.

The sensing electrode 200 may include a metallic material having excellent electrical conductivity and may be provided in a mesh shape. In other words, the sensing electrode 200 may include a first conductive pattern. The sensing electrode 200 may include the first and second sensing electrodes 210 and 220, and the first and second sensing electrodes 210 and 220 may be provided on the same planes of the substrate 100. For example, the first and second sensing electrodes 210 and 220 may make direct contact with the substrate 100.

In this case, the first sensing electrode 210 and the second sensing electrode 220 may be spaced apart from each other while being adjacent to each other. The first sensing electrode 210 may include a concave part ( ⌐⌐ ), and the second sensing electrode 220 may include a convex part ( ⌐⌐ ). The concave part ( ⌐⌐ ) of the first sensing electrode 210 may be engaged with the convex part ( ⌐⌐ ) of the second sensing electrode 220. Accordingly, the first and second sensing electrodes 210 and 220 may be provided on the same plane of the substrate 100. However, the shapes of the first and second sensing electrodes 210 and 220 are not limited to the shapes shown in FIGS. 11 and 12, but the first and second sensing electrodes 210 and 220 may have various shapes.

The wire 350 may include first and second wires 360 and 370 connected with the first sensing electrode 210 and the second sensing electrode 220, respectively. In addition, the first and second wires 360 and 370 are provided in the first region 1A, and connected with the first sensing electrode 210 and the second sensing electrode 220, respectively. Therefore, the first and second sensing electrodes 210 and 220 may have no additional bridge pattern.

In this case, the wire 350 may include a transparent conductive material. In other words, the sensing electrode 200 may include a material different from that of the wire 350.

The sensing electrode 200 is formed of a metallic material, and the wire 350 is formed of a transparent conductive material. The wire 350 may include a metallic oxide, such as indium tin oxide, indium zinc oxide, copper oxide, tin oxide, zinc oxide, or titanium oxide, serving as the transparent conductive material. In addition, the wire 350 may include a nanowire, a photosensitive nanowire film, CNT, graphene, conductive polymer or the mixture thereof, but the embodiment is not limited thereto. In other words, the wire 350 may include various materials serving as the transparent conductive material for the connection with the sensing electrode 200. In this case, the sensing electrode 200 may include at least one of metallic materials including chromium (Cr), nickel (Ni), copper (Cu), aluminum (Al), silver (Ag), molybdenum (Mo), gold (Au), titanium (Ti) and the alloy thereof.

According to the related art, the wire 350 is formed of a metallic material likewise the sensing electrode 200. When the wire 350 including the metallic material is formed in the first region 1A, even if the thin metallic wire 350 is formed, the metallic wire may be easily viewed by the eyes of the user due to the total reflection characteristic and the vertically uniform shape of the metal.

As the wire 350 according to the present invention is formed a transparent conductive material, the visibility can be improved. In other words, even if the wire 350 is formed in the vertically uniform shape, the wire 350 is formed of a transparent material, so that the transparency can be ensured.

Referring to FIGS. 12 and 13, the first and second sensing electrodes 210 and 220 including a metallic material is provided on the substrate 100. An insulating layer 150 is formed on the substrate 100 having the first and second sensing electrodes 210 and 220. The insulating layer 150 may have a groove to expose portions of the first and second sensing electrodes 210 and 220.

The first and second wires 360 and 370 are formed on the insulating layer 150 having the groove by using a transparent conductive material. In this case, the first and second wires 360 and 370 are formed on the first and second sensing electrodes 210 and 220 exposed through the groove, and the sensing electrode 200 may be connected with the wire 350.

The insulating layer 150 having the groove to expose the portions of the sensing electrode 200 is interposed between the sensing electrode 200 and the wire 350. The sensing electrode 200 makes contact with the wire 350 through the groove, and the wire 350 is provided on the sensing electrode 200 at the contact area between the wire 350 and the sensing electrode 200.

The groove may expose a plurality of mesh line parts when viewed in a sectional view. In addition, the groove may be formed to expose a plurality of mesh line parts and a mesh opening part between the mesh line parts when viewed in a sectional view. The wire 350 may be provided at the mesh line parts and the mesh opening part exposed through the groove.

In other words, the groove exposes the top surface and the lateral side of the sensing electrode 200 and the top surface of the substrate 100, and the wire 350 makes contact with the top surface and the lateral side of the sensing electrode 200 and the top surface of the substrate 100 exposed through the groove. Therefore, the wire 350 may be provided on the sensing electrode 200 at the mesh line part, and may be provided on the lateral side of the sensing electrode 200 and the substrate 100 at the mesh opening part.

Therefore, the sensing electrode 200 is formed of a metallic material so that the sensing electrode 200 may be applied with low resistance to a large-area touch window. The wire 350 is formed of a transparent conductive material, so that the visibility of the touch window can be improved.

In addition, the first and second sensing electrodes 210 and 220 are provided on the same plane of the substrate 100, so that the thickness of the touch window can be reduced, and the visibility can be improved. In other words, when the first and second sensing electrodes 210 and 220 are provided on different substrates, respectively, the thickness of the touch window may be increased. In addition, when viewed from the top, the conductive pattern of the first electrode part 310 and the conductive pattern of the second sensing electrode 220 overlap with each other, so that the moire phenomenon may occur. However, according to the embodiment, the first electrode part 310 and the second sensing electrode 220 are provided on one plane to prevent the moire phenomenon. Further, the sensing electrode 200 includes a conductive pattern, so that the bending characteristic and the reliability of the touch window can be improved.

Hereinafter, a touch window according to another embodiment will be described with reference to FIG. 14. In the following of the touch window according to the embodiment, the details of structures or elements the same as or similar to those of the above-described touch window according to previous embodiments will be omitted, and the same reference numerals will be assigned to the same elements. Referring to FIG. 14, a touch window according to another embodiment of the present invention may include a sensing electrode 520 including a pattern layer 502 and an electrode layer 501. The pattern layer 502 may include first and second sub-patterns 511 and 512.

The first sub-pattern 511 is provided in a mesh line part on the substrate 100. Accordingly, the first sub-pattern 511 is provided in a mesh shape. The first sub-pattern 511 may be an embossed pattern.

The second sub-pattern 512 is provided in a mesh opening part on the substrate 100. Accordingly, the second sub-pattern 512 may be provided between first sub-patterns 511. The second sub-pattern 512 may be an embossed pattern.

The first and second sub-patterns 511 and 512 may include resin or polymer. The first and second sub-patterns 511 and 512 may be formed through an imprinting process. In other words, the first and second sub-patterns 511 and 512 may be formed using a mold having a pattern to be formed on the resin or the polymer. Although the drawings show that the first and second sub-patterns 511 and 512 are expressed as angular protrusion parts, the embodiment is not limited thereto. The protrusion parts may have various shapes according to occasions.

The electrode layer 501 is provided on the first sub-pattern 511. Accordingly, the electrode layer 501 is provided in the mesh line part, and provided in a mesh shape. The electrode layer 501 may include various metals having excellent electrical conductivity. For example, the electrode layer 501 may include at least one of metallic materials including Cr, Ni, Cu, Al, Ag, Mo, Au, Ti, and the alloy thereof.

An electrode material may be formed on the first and second sub-patterns 511 and 512. The electrode material may be formed through a deposition scheme or a plating scheme.

Thereafter, the electrode material may be etched. In this case, the difference between the structures of the first and second sub-patterns 511 and 512, and the difference between the bonding areas of the first and second sub-patterns 511 and 512 to the electrode material are made. In other words, since the bonding area of the first sub-pattern 511 to the electrode material is wider than the bonding area of the second sub-pattern 512 to the electrode material, the electrode material is less etched on the first sub-pattern 511.

In other words, when the etching is performed at the same etching rate, the electrode material on the first sub-pattern 511 remains, and the electrode material on the second sub-pattern 512 is etched and removed. Meanwhile, the electrode material may be formed only on the first sub-pattern 511, and the electrode layer 501 may be provided in the mesh shape.

The insulating layer 150 is formed on the sensing electrode 520 including the pattern layer 502 and the electrode layer 501. The insulating layer 150 may include a groove to expose a portion of the sensing electrode 520. The insulating layer 150 may be formed to expose the electrode layer 501 of the sensing electrode 520.

The wire 370 is formed on the insulating layer 150 having the groove by using a transparent conductive material. In this case, the wire 370 is formed on a portion of the sensing electrode 520 exposed through the groove. The sensing electrode 520 may be connected with the wire 370.

The groove may expose a plurality of mesh line parts when viewed in a sectional view. In addition, the groove may be formed to expose a plurality of mesh line parts and a mesh opening part between the mesh line parts when viewed in a sectional view. The wire 370 may be provided at the mesh line part and the mesh opening part exposed through the groove.

In other words, the groove exposes the top surface and the lateral side of the electrode layer 501, the lateral side of the sub-pattern 511, and the top surface and the lateral side of the second sub-pattern 512. The wire 370 makes contact with the top surface and the lateral side of the electrode layer 501, the lateral side of the first sub-pattern 511, and the top surface and the lateral side of the second sub-pattern 512, which are exposed through the groove. Accordingly, the wire 370 is provided on the electrode layer 501 at the mesh line part, and makes contact with the lateral side of the electrode layer 501, the lateral side of the first sub-pattern, and the top surface and the lateral side of the second sub-pattern 512, which are provided at the mesh opening part, at the mesh opening part.

Hereinafter, a touch window according to another embodiment will be described with reference to FIG. 15. In the following of the touch window according to the embodiment, the details of structures or elements the same as or similar to those of the above-described touch window according to previous embodiments will be omitted, and the same reference numerals will be assigned to the same elements.

Referring to FIG. 15, a touch window according to another embodiment of the present invention may include a sensing electrode 620 including a pattern layer 602 and an electrode layer 601. The pattern layer 602 may include an intaglio part 611 and an embossed part 612.

The intaglio part 611 is provided at a mesh line part on the substrate 100. Accordingly, the intaglio part 611 is provided in a mesh shape. The embossed part 612 is provided at the mesh opening part on the substrate 100. In other words, the embossed part 612 may be provided between intaglio parts 611. The embossed part 612 may be formed together with the intaglio part 611 when the intaglio part 611 is formed. Although the drawings show that the embossed part 612 is expressed as an angular protrusion part, the embodiment is not limited thereto. The protrusion parts may have various shapes according to occasions.

The pattern layer 601 may include resin or polymer. The intaglio part 611 may be formed through an imprinting process. In other words, the intaglio part 611 may be formed by coating the resin or the polymer on the substrate 100, placing a mold on the resultant structure, and performing the imprinting process with respect to the resultant structure.

The electrode layer 601 may be provided in the intaglio part 611. In other words, the electrode layer 601 may be formed by filling an electrode material in the intaglio part 611. Accordingly, the process number, the process time, and the process cost can be more reduced as compared with conventional deposition and photolithography processes.

The electrode material constituting the electrode layer 601 may be filled as a doctor knife is moved in the contact with the pattern layer 602. The electrode layer 601 may include a binder and conductive particles dispersed in the binder. The conductive particles are dispersed in the binder. The conductive particles are uniformly dispersed in the binder, so that the uniformity of the electrode layer 601 can be improved. The conductive particles may include at least one of metallic materials including Cr, Ni, Cu, Al, Ag, Mo, Au, Ti, and the alloy thereof.

As the electrode layer 601 is provided in the intaglio part 611, the electrode layer 601 is provided at the mesh line part. Accordingly, the electrode layer 601 is provided in the mesh shape. The mesh shape may be randomly formed to prevent the moire phenomenon.

The insulating layer 150 is interposed between the sensing electrode 620 and the wire 370. The insulating layer 150 may have a groove to expose a portion of the sensing electrode 620. In particular, the groove formed in the insulating layer 150 is formed to expose the electrode layer 601 of the sensing electrode 620. The sensing electrode 620 makes contact with the wire 370 through the groove.

The groove may expose a plurality of mesh line parts when viewed in a sectional view. In addition, the groove may be formed to expose a plurality of mesh line parts and a mesh opening part between the mesh line parts when viewed in a sectional view. The wire 370 may be provided at the mesh line parts and the mesh opening part exposed through the groove.

In other words, the groove exposes the top surface of the electrode layer 601 and the top surface of the embossed part 612, and the wire 370 makes contact with the top surface of the electrode layer 601 and the top surface of the embossed part 612, which are exposed through the groove. Therefore, the wire 370 may be provided on the electrode layer 601 at the mesh line part, and may be provided on the pattern layer 602 at the mesh opening part. In detail, the wire 370 may be provided on the embossed part 612 of the pattern layer 602 at the mesh opening part.

Hereinafter, a touch window according to another embodiment will be described with reference to FIGS. 16 to 19. In the following of the touch window according to the embodiment, the details of structures or elements the same as or similar to those of the above-described touch window according to previous embodiments will be omitted, and the same reference numerals will be assigned to the same elements.

Referring to FIGS. 16 and 18, first and second patterns 701 and 702 are formed on the substrate 100. In other words, the first and second patterns 701 and 702 may be formed on the same plane. The first and second patterns 701 and 702 are formed at a region where first and second sensing electrodes are provided thereafter.

The first and second patterns 701 and 702 may include various metallic materials having excellent electrical conductivity. For example, the first and second patterns 701 and 702 may include Cu, Au, Ag, Al, Ti, Ni, and the alloy thereof.

In this case, the first and second patterns 701 and 702 may be spaced apart from each other adjacent to each other. The first pattern 701 may include a concave part (凹), and the second pattern 702 may include a convex part (凸). The concave part (凹) of the first pattern 701 may be engaged with the convex part (凸) of the second pattern 702. However, the first pattern 701 and the second pattern 702 may have various shapes only if the first and second patterns 701 and 702 are engaged with each other, and the embodiment is not limited to the shapes shown in FIG. 16.

Thereafter, a transparent conductive layer 351 is formed on the entire surface of the substrate having the first and second patterns 701 and 702. The transparent electrode layer 351 may entirely make contact with the first and second patterns 701 and 702.

The transparent conductive layer 351 may include a transparent conductive material. For example, the transparent conductive material may include a metallic oxide, such as an indium tin oxide, an indium zinc oxide, a copper oxide, a tin oxide, a zinc oxide, or a titanium oxide.

Referring to FIGS. 17 to 19, the first pattern 701, the second pattern 702, and the transparent conductive layer 351 are etched to form a first sensing electrode 710, a second sensing electrode 720, a first wire 360, and a second wire 370.

The first pattern 701, the second pattern 702, and the transparent electrode layer 351 formed on the first and second patterns 701 and 702 are etched in the mesh shape, so that the first sensing electrode 710 and the second sensing electrode 720 may be formed. In this case, the mesh shape may be randomly formed to prevent a moire phenomenon.

In this case, the first and second sensing electrodes 710 and 720 are provided on the same plane, and first and second electrode layers 711 and 712 may be formed in a lamination layer.

The first and second patterns 701 and 702 may be the first electrode layer 711, and the transparent conductive layer 351 may be the second electrode layer 712. In other words, the first electrode layer 711 may be formed of a metallic material, and the second electrode layer 712 may be formed of a transparent conductive material.

The first wire 360 and the second wire 370 are provided in the active region of the substrate 100, and the first sensing electrode 710 is connected with the second sensing electrode 720. The first and second wires 360 and 370 may be formed by etching the transparent conductive layer 351. In other words, the first and second wires 360 and 370 are formed of a transparent conductive material. For example, the transparent conductive material may include metallic oxides, such as indium tin oxide, indium zinc oxide, copper oxide, tin oxide, zinc oxide, and titanium oxide.

Accordingly, the transparent conductive layer 351 is etched to form a second electrode layer 712 of the first and second electrodes 710 and 720, the first wire 360, and the second wire 370. In other words, the first and second wires 360 and 370 may be formed as a portion of the second electrode layer 712 extends.

Accordingly, differently from another embodiment, an insulating layer may be omitted. In addition, the sensing electrode includes an electrode layer including a metallic material to reduce resistance and is applicable to a large-size touch window. In addition, the wire is formed of a transparent conductive material, so that the visibility can be ensured even if the wire is formed in a vertically uniform shape.

Hereinafter, a touch window according to another embodiment will be described with reference to accompanying drawings 20 and 21. In the following of the touch window according to the embodiment, the details of structures or elements the same as or similar to those of the above-described touch window according to previous embodiments will be omitted, and the same reference numerals will be assigned to the same elements.

Referring to FIGS. 20 and 21, the touch widow according to the embodiment may include a cover substrate 130, a sensing electrode 200, a wire 300, and a printed circuit board.

A substrate 100 may be provided under the cover substrate 130. In this case, an optical clear adhesive 600 may be interposed between the cover substrate 130 and the substrate 100 in order to combine the cover substrate 130 and the substrate 100 with each other.

The sensing electrode 200 may be provided on the substrate 100. The sensing electrode 200 may include first and second sensing electrodes 210 and 220. The first and second sensing electrodes 210 and 220 may be provided on the same plane of the substrate 100. One of the first and second sensing electrodes 210 and 220 transmits a signal, and the other receives a touch signal. A plurality of first and second sensing electrodes 210 and 220 may be provided.

The first sensing electrode 210 may be provided in the second sensing electrode 220. In detail, at least one first sensing electrode 210 may be provided in one second sensing electrode 220. In other words, a plurality of first sensing electrodes 210 may be provided in one second sensing electrode 220. For example, as shown in FIG. 21, three first sensing electrodes 210 may be provided in one second sensing electrode 220. Therefore, a surficial area of the second sensing electrode 220 may be greater than a surficial area of the first sensing electrode 210.

The second sensing electrode 220 and a plurality of first sensing electrodes 210 provided in the second sensing electrode 220 may be defined as one electrode unit U. The electrode unit U may be repeatedly provided up, down, left or right on the substrate 100.

As the first sensing electrode 210 and the second sensing electrode 220 are provided on the same plane, the thickness of the touch window can be reduced. In other words, when comparing with the case that the first and second sensing electrodes 210 and 220 are provided on different electrode substrates, respectively, the thickness can be more reduced.

Thereafter, the wire 300 is formed on the substrate 100. The wire 300 may apply an electrical signal to the sensing electrode 200. The wire 300 may include a material the same as or similar to that constituting the sensing electrode 200.

The wire 300 may include a first wire 310 for the electrical connection with the first sensing electrode 210 and a second wire 320 for the electrical connection with the second sensing electrode 220.

The first wire 310 and the second wire 320 may be withdrawn in the same direction on the substrate 100. The first wire 310 and the second wire 320 may be withdrawn in the same direction inside the electrode unit U. In detail, the first and second wires 310 and 320 of the electrode unit U provided at an upper portion of the substrate 100 may be withdrawn upward of the substrate 100. In addition, the first and second wires 310 and 320 of the electrode unit U provided under the substrate 100 may be withdrawn downward of the substrate 100.

The first wire 310 may include a part surrounded by the second sensing electrode 220. A part of the first wire 310 connected with the first sensing electrode 210 may be surrounded by the second sensing electrode 220. The first wire 310 may be connected with the first sensing electrode 210 while extending out of the second sensing electrode 220.

The second wire 320 may be formed integrally with the second sensing electrode 220 and may be withdrawn in the same direction as that of the first wire 310.

Meanwhile, a printed circuit board connected with the wire 300 may be additionally provided. The printed circuit board may include various types of printed circuit boards.

For example, the printed circuit board may include flexible printed circuit board (FPCB).

Meanwhile, although the drawings show that the sensing electrode 200 and the wire 300 are provided on the substrate 100, the embodiment is not limited thereto. Accordingly, the sensing electrode 200 and the wire 300 are directly provided on the cover substrate 130, so that the thickness of the touch window can be more reduced.

Hereinafter, the touch window according to another embodiment will be described with reference to FIG. 22. In the following of the touch window according to the embodiment, the details of structures or elements the same as or similar to those of the above-described touch window according to previous embodiments will be omitted, and the same reference numerals will be assigned to the same elements.

Referring to FIG. 22, the first sensing electrode 211 may be in the second sensing electrode 221. The first sensing electrode 211 may be surrounded by the second sensing electrode 221.

In addition, the first wire 311 for the connection with the first sensing electrode 211 may be provided in the second sensing electrode 221. The first wire 311 may be surrounded by the second sensing electrode 221. The first wire 311 may extend in a longitudinal direction of the second sensing electrode 221 within the second sensing electrode 221. In this case, the interval D1 between the first wires 311 may correspond to the interval D1 between the first wires 311. In other words, the intervals D1 between the first wires 311 may be equal to or approximate to each other.

In addition, a first wire part 311a provided inside the second sensing electrode may have a length longer than that of a first wire part 311b provided outside the second sensing electrode 221. Therefore, the area of the first wire 311 provided outside the second sensing electrode 221 may be reduced. Accordingly, electrode units U can be more densely arranged, and the touch sensitivity can be improved.

Referring to FIG. 23, the second sensing electrode 221 includes a first sensing electrode region S and first wire paths L1, L2, and L3.

The first sensing electrode region S may be a region where the first sensing electrode 211 is provided. In other words, the first sensing electrode 211 may be provided in the first sensing electrode region S.

The first wire paths L1, L2, and L3 may be passages through which the first wires 311 pass. In other words, the first wires 311 may be provided in the first wire paths L1, L2, and L3. The first wire paths L1, L2, and L3 may extend in the longitudinal direction of the second sensing electrode 211. In this case, intervals D2 between the first wire paths L1 and L2 and between the first wire paths L2 and L3 may correspond to each other. In other words, the intervals D2 between the first wire paths L1 and L2 and between the first wire paths L2 and L3 may be equal to each other or approximate to each other.

As the first wires 311 are provided in the first wire paths L1, L2, and L3 in the second sensing electrode 221, the array of electrode units U may be more densely achieved. In other words, since the first wire 311 is provided in the second sensing electrode 221, the space can be efficiently used. Accordingly, more many electrode units U may be provided on the substrate 100. Accordingly, the number of electrodes is increased, so that the position can be more accurately improved.

Meanwhile, the intervals D2 between the first wire paths L1 and L2 and between the first wire paths L2 and L3 may be greater than a width W of each of the first wire paths L1, L2, and L3. Therefore, since the second sensing electrode 221 may have a wider width, a touch can be more accurately detected. In other words, if the width W of each of the first wire paths L1, L2, and L3 is greater than the intervals D2 between the first wire paths L1 and L2 and between the first wire paths L2 and L3, the region of the second sensing electrode 221 may be reduced. In addition, if the difference in a width between the first sensing electrode 211 and the first wire 311 is reduced, the accuracy in the touch sense may be degraded.

Meanwhile, referring to FIG. 24, a plurality of first sensing electrodes 212 may be provided in one sensing electrode 222. In detail, the number of the first sensing electrodes 212 provided in an electrode unit U1 of FIG. 24 may be more than the number of the first sensing electrodes 211 provided in the electrode unit U of FIG. 22.

In addition, wires 302 inside one electrode unit U1 may be withdrawn in mutually different directions. In detail, the electrode unit U1 may include a wire withdrawn upward of the substrate 100 and a wire withdrawn downward of the substrate 100.

Meanwhile, referring to FIG. 25, the sensing electrode 200 and the wire 300 may include conductive patterns. In other words, the sensing electrode 200 and the wire 300 may be provided in the mesh shape.

In detail, the sensing electrode 200 and the wire 300 include a conductive pattern opening part OA and a conductive pattern line part LA. In this case, the conductive pattern line part LA may have a line width in the range of 0.1 μm to 10 μm. The conductive pattern line part having the line width Ti of 0.1 μm or less may not be fabricated. If the line width is 10 μm or less, the patterns of the sensing electrode 200 and the wire 300 may not be viewed. Preferably, the line width of the conductive pattern line part LA may be in the range of 1 μm to 7 μm. More preferably, the line width of the conductive pattern line part LA may be in the range of about 2 μm to about 5 μm.

Meanwhile, as shown in FIG. 25, conductive patterns may have regular shapes. In other words, the conductive pattern opening part OA may have a rectangular shape. However, the embodiment is not limited thereto, but the conductive pattern opening part OA may have various shapes including a polygonal shape, such as a diamond shape, a pentagonal shape, or a hexagonal shape, or a circular shape.

In addition, the embodiment is not limited thereto, but the conductive pattern may have an irregular shape. In other words, various conductive pattern opening parts may be provided in one conductive pattern. Therefore, the sensing electrode 200 and the wire 300 may include conductive pattern opening parts having various shapes.

As the sensing electrode 200 and the wire 300 have a mesh shape, the patterns of the sensing electrode 200 and the wire 300 may not be viewed in the active region. In other words, even if the sensing electrode 200 and the wire 300 are formed of metal, the pattern may not be viewed. In addition, even if the sensing electrode 200 and the wire 300 are applied to the large-size touch window, the resistance of the touch window may be lowered. In addition, when the sensing electrode 200 and the wire 300 are formed a printing process, the printing quality can be improved, so that the high-quality touch window can be ensured.

In addition, as the first and second sensing electrodes 210 and 220 are provided on the same plane, the moire phenomenon can be improved, so that the visibility can be improved. In other words, when the first and second sensing electrodes 210 and 220 are provided on different electrode substrates, respectively, the conductive pattern of the first sensing electrode 210 and the conductive pattern of the second sensing electrode 220 may overlap with each other when viewed from the top, so that a moire phenomenon may occur. However, according to the embodiment, the first and second sensing electrodes 210 and 220 may be provided on one plane to prevent the moire phenomenon.

Thereafter, as shown in FIGS. 26 and 27, a touch window 10 according to various embodiments may be provided on a display panel 20 serving as a driving unit. The touch window 10 and the display panel 20 are combined with each other to constitute the display. As shown in FIG. 11, the display may be included in a mobile terminal.

In particular, the touch window 10 may include a curved touch window. Accordingly, the display including the touch window 10 may be a curved display. Particularly, referring to FIGS. 26 and 27, only an edge of the display may be curved.

The display panel 20 has a display region used to output an image. The display panel 20 applied to the display may generally include an upper substrate 21 and a lower substrate 22. The lower substrate 22 may include a data line, a gate line, and a thin film transistor (TFT). The upper substrate 21 is bonded to the lower substrate 22 to protect components provided on the lower substrate 22.

The display panel 20 may have various shapes depending on the type of the display according to the present invention. In other words, the display according to the present invention may include a liquid crystal display LCD, a field emission display, a plasma display (PDP), an organic light emitting device (OLED), and an electrophoretic display (EPD). Accordingly, the display panel 20 may have various shapes.

Meanwhile, referring to FIGS. 28 and 29, the display may be a curved display, and may have an entirely curved shape.

The display may be formed by combining the cover substrate 130 with the display panel 20. The cover substrate 130 may be bonded to the display panel 20 through an adhesive layer. For example, the cover substrate 130 may be combined with the display panel 20 through an adhesive layer including an optical transparent adhesive (OCA) or an optical transparent resin (OCR).

As shown in drawings, the sensing electrode may be provided on the display panel 20. In other words, the display panel 20 may serve as the substrate 100.

In addition, a polarizing plate may be further provided under the cover substrate 130. The polarizing plate may be a linear polarizing plate or an anti-reflection polarizing plate. For example, when the display panel 20 is a liquid crystal display panel, the polarizing plate may be a linear polarizing plate. In addition, when the display panel 20 is an organic electroluminescent display panel, the polarizing plate may be an anti-reflection polarizing plate. At least one sensing electrode may be provided on one surface of the polarizing plate. In other words, the polarizing plate may serve as the substrate 100.

According to the display of the embodiment, at least one substrate to support a sensing electrode may be omitted. Accordingly, a thin and light display may be formed.

Meanwhile, referring to FIG. 30, the display panel 20 includes an upper substrate 21 and a lower substrate 22. A sensing electrode may be interposed between the upper and lower substrates 21 and 22. In other words, the sensing electrode may be provided on at least one surface of the upper substrate 21 or the lower substrate 22.

In addition, a polarizing plate may be further provided under the cover substrate 130.

According to the display of the embodiment, at least one substrate to support the sensing electrode may be omitted. Accordingly, the thin and light display may be formed. In addition, the sensing electrode and the wire are formed together with a device formed in the display panel, so that the process can be simplified and the cost can be saved.

Meanwhile, referring to FIG. 31, the touch window may include a flexible touch window which is curved. Accordingly, the display including the touch window may be a flexible display. Accordingly, a user may curve or bend the touch window with a hand of the user.

Meanwhile, referring to FIG. 32, the touch window may be applied to a vehicle navigation system as well as a mobile terminal. In addition, referring to FIG. 33, the touch panel may be applied to vehicle navigation. Although a vehicle navigation is depicted in the drawings, the embodiment is not limited thereto. Accordingly, the touch window is applied to a dashboard as well as a PND (Personal Navigation Display) so that a CID (Center Information Display) may be implemented. However, the embodiment is not limited to the embodiment. In other words, the display may be used in various electronic products.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

INDUSTRIAL APPLICABILITY

According to the touch window of the embodiment, the reliability and the visibility can be improved, and the size can be reduced.

The invention claimed is:

1. A touch window comprising:
   a substrate comprising a first region in which a touch is sensed and a second region provided at an edge of the first region;
   a sensing electrode in the first region to sense a touch position of the first region; and
   a linear wire connected with the sensing electrode,
   wherein the linear wire comprises a first wire part provided in the first region and a second wire part provided in the second region,
   wherein a line width of the first wire part is less than a line width of the second wire part,
   wherein a ratio of the line width of the first wire part to the line width of the second wire part is in a range of more than 1:1 to less than or equal to 1:5,
   wherein the first wire part and second wire part connect to each other at a border between the first region and the second region,
   wherein an image is displayed in the first region, and is not displayed in the second region,
   wherein the sensing electrode and the linear wire comprise a plurality of conductive pattern line parts and a plurality of conductive pattern opening parts,
   wherein the plurality of conductive pattern line parts cross each other,
   wherein the sensing electrode and the wire have a mesh shape,
   wherein the first wire part and the second wire part are disposed on a same surface of the substrate, and wherein the first wire part and the second wire part connect at the same surface of the substrate.

2. The touch window of claim 1, wherein the sensing electrode comprises a first sensing electrode and a second sensing electrode, and the first sensing electrode and the second sensing electrode are provided on a same plane.

3. The touch window of claim 2, wherein the first sensing electrode faces the second sensing electrode.

4. The touch window of claim 2, wherein the first sensing electrode comprises a first sensing part and a second sensing part having directionalities different from each other, and the second sensing part extends from the first sensing part.

5. The touch window of claim 4, wherein an angle formed between the first sensing part and the second sensing part is 90° or less.

6. The touch window of claim 4, further comprising a third sensing part extending from the second sensing part and having a directionality different from the directionality of the second sensing part.

7. The touch window of claim 6, wherein the second sensing electrode comprises a fourth sensing part and a fifth sensing part having directionalities different from each other, and the fifth sensing part extends from the fourth sensing part.

8. The touch window of claim 7, further comprising a sixth sensing part extending from the fifth sensing part and having a directionality different from the directionality of the fifth sensing part.

9. A touch panel comprising:
a substrate;
a plurality of first wires provided on the substrate;
a plurality of first sensing electrodes, each first sensing electrode being connected to an end of a respective first wire of the plurality of first wires, wherein a width of the first sensing electrode is greater than a width of the first wire;
a second sensing electrode provided on the substrate; and
a second wire for electrical connection of the second sensing electrode,
wherein the first sensing electrodes and the second sensing electrode are provided on a same plane, and
wherein the second sensing electrode surrounds each of the first wires and the first sensing electrodes.

10. The touch panel of claim 9, wherein the plurality of first wires includes a pair of first wires, and
wherein the pair of first wires extend from opposite sides of the second sensing electrode.

11. The touch panel of claim 9, wherein the plurality of first wires includes a pair of first wires,
wherein the pair of first wires extend from a same side of the second sensing electrode, and
wherein the pair of first wires are separated by an interval which is greater than the width of each of the pair of first wires.

12. The touch panel of claim 9, wherein each first wire extends in a first direction, and
wherein each first sensing electrode extends from the respective first wire in a second direction perpendicular to the first direction.

* * * * *